US012050715B2

(12) United States Patent
Ackerman et al.

(10) Patent No.: US 12,050,715 B2
(45) Date of Patent: *Jul. 30, 2024

(54) LIVE DISCOVERY OF ENTERPRISE THREATS BASED ON SECURITY QUERY ACTIVITY

(71) Applicant: Sophos Limited, Abingdon (GB)

(72) Inventors: Karl Ackerman, Topsfield, MA (US); Andrew J. Thomas, Oxfordshire (GB); Kenneth D. Ray, Seattle, WA (US)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,350

(22) Filed: Aug. 14, 2023

(65) Prior Publication Data

US 2023/0385447 A1    Nov. 30, 2023

Related U.S. Application Data

(63) Continuation of application No. 17/343,670, filed on Jun. 9, 2021, now Pat. No. 11,727,143.

(60) Provisional application No. 63/042,219, filed on Jun. 22, 2020.

(51) Int. Cl.
| G06F 21/62 | (2013.01) |
| G06F 16/21 | (2019.01) |
| G06F 16/215 | (2019.01) |
| G06F 16/2455 | (2019.01) |
| G06Q 10/067 | (2023.01) |
| H04L 9/40 | (2022.01) |

(52) U.S. Cl.
CPC ........ *G06F 21/6245* (2013.01); *G06F 16/211* (2019.01); *G06F 16/215* (2019.01); *G06F 16/24568* (2019.01); *G06Q 10/067* (2013.01); *H04L 63/1416* (2013.01); *H04L 63/1425* (2013.01); *H04L 63/1441* (2013.01)

(58) Field of Classification Search
CPC .......... G06F 21/6245; G06F 16/24568; G06F 16/215; G06F 16/211; G06Q 10/067; H04L 63/1416; H04L 63/1425; H04L 63/1441

See application file for complete search history.

(56) References Cited

U.S. PATENT DOCUMENTS

| 8,181,244 B2 | 5/2012 | Boney |
| 8,201,243 B2 | 6/2012 | Boney |
| 8,418,250 B2 | 4/2013 | Morris et al. |
| 8,719,932 B2 | 5/2014 | Boney |
| 8,726,389 B2 | 5/2014 | Morris et al. |
| 8,763,123 B2 | 6/2014 | Morris et al. |

(Continued)

OTHER PUBLICATIONS

USPTO, "U.S. Appl. No. 17/343,670 Final Office Action mailed Dec. 1, 2022", 7 pages.

(Continued)

*Primary Examiner* — Kambiz Zand
*Assistant Examiner* — Afaq Ali
(74) *Attorney, Agent, or Firm* — Strategic Patents, P.C.

(57) ABSTRACT

A threat management system provides a collection of queries for investigating security issues within an enterprise. Useful inferences are drawn about the value of different queries, and about the security posture of the enterprise, by monitoring contextual activity such as the popularity and context of query usage, patterns of end user modification to queries, and post-query activity.

20 Claims, 16 Drawing Sheets

(56) References Cited

U.S. PATENT DOCUMENTS

| | | | |
|---|---|---|---|
| 8,856,505 B2 | 10/2014 | Schneider | |
| 9,413,721 B2 | 8/2016 | Morris et al. | |
| 9,489,423 B1 | 11/2016 | Muthiah et al. | |
| 9,578,045 B2 | 2/2017 | Jaroch et al. | |
| 10,257,224 B2 | 4/2019 | Jaroch et al. | |
| 10,311,235 B2* | 6/2019 | Bobritsky | G06F 21/566 |
| 10,885,393 B1* | 1/2021 | Sirianni | G06F 18/2411 |
| 11,743,285 B2* | 8/2023 | Luger | H04L 63/1483 |
| | | | 726/23 |
| 2011/0202522 A1* | 8/2011 | Ciemiewicz | G06F 16/9535 |
| | | | 707/711 |
| 2011/0283360 A1* | 11/2011 | Abadi | H04L 63/1416 |
| | | | 726/24 |
| 2012/0136921 A1 | 5/2012 | Samdadiya et al. | |
| 2020/0089680 A1 | 3/2020 | Mital et al. | |
| 2021/0334821 A1* | 10/2021 | Berrington | H04L 63/083 |
| 2021/0342339 A1* | 11/2021 | Renner | G06F 16/24568 |
| 2021/0400070 A1 | 12/2021 | Ackerman et al. | |

OTHER PUBLICATIONS

USPTO, "U.S. Appl. No. 17/343,670 Non-Final Office Action mailed Aug. 5, 2022", 23 pages.

USPTO, "U.S. Appl. No. 17/343,670 Notice of Allowance mailed Feb. 21, 2023", 13 pages.

USPTO, "U.S. Appl. No. 17/343,670 Notice of Allowance mailed Mar. 22, 2023", 7 pages.

* cited by examiner

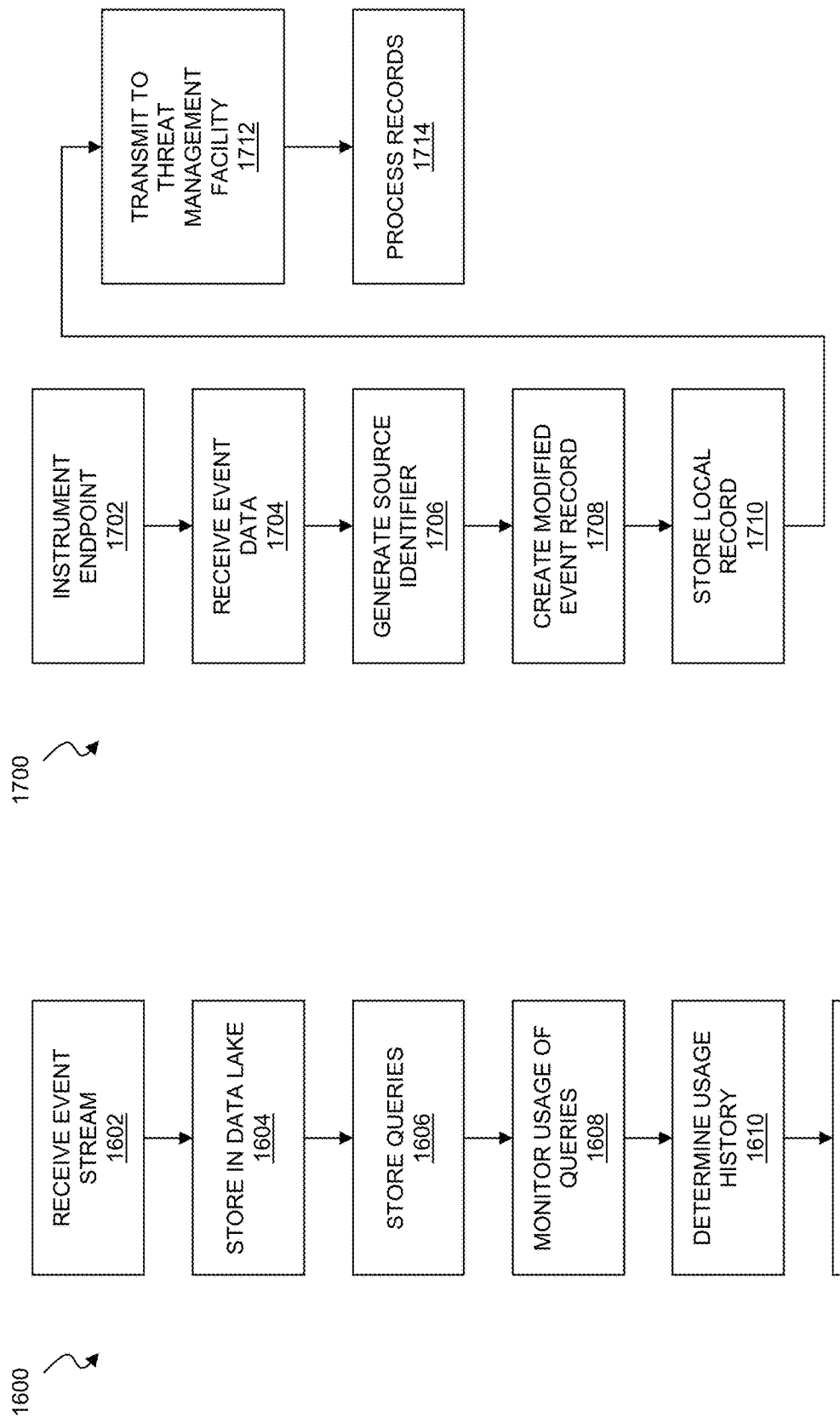

LIVE DISCOVERY OF ENTERPRISE THREATS BASED ON SECURITY QUERY ACTIVITY

CROSS-REFERENCE TO RELATED APPLICATIONS

This application is a continuation of U.S. patent application Ser. No. 17/343,670 filed on Jun. 9, 2021 (now U.S. Pat. No. 11,727,143), which claims priority to U.S. Provisional Patent Application No. 63/042,219 filed on Jun. 22, 2020, where the entire content of each of the foregoing is hereby incorporated by reference.

This application is also related to U.S. patent application Ser. No. 16/165,274 filed on Oct. 19, 2018, U.S. patent application Ser. No. 16/383,315 filed on Apr. 12, 2019, and U.S. patent application Ser. No. 16/128,953 filed on Sep. 12, 2018. The entire contents of each of the foregoing applications are hereby incorporated by reference.

FIELD

The present disclosure relates to the use of event streams for recording, monitoring, and investigation of enterprise security.

BACKGROUND

As enterprise networks become more complex, and security threats become more sophisticated, there remains a need for improved techniques for monitoring security events and for identifying and investigating potential security threats within the enterprise network.

SUMMARY

An aspect of the present teachings is directed to a filtered data lake for enterprise security. A data lake for enterprise security is created from an asynchronous streams of security events by deduplicating objects and creating metadata related to downstream security functions. Deduplication of objects may be efficiently performed with a bloom filter as objects are ingested into the data lake. The objects may also be augmented with metadata arranged in schemas to facilitate monitoring and use within the data lake.

In one aspect, a computer program product disclosed herein may include computer executable code embodied in a non-transitory computer readable medium that, when executing on one or more computing devices, performs the steps of: storing a data lake containing a first plurality of data objects representing security events and a plurality of descriptions for the first plurality of data objects, where the first plurality of data objects include security events from one or more data recorders on endpoints in an enterprise network, and where each of the plurality of descriptions is organized according to one or more schemas; receiving a second plurality of data objects in an asynchronous stream of security events from the enterprise network, the asynchronous stream including a combination of batch transfers including groups of security events and streaming transfers of individual security events; filtering the second plurality of data objects to remove duplicate data objects already included in the first plurality of data objects, where filtering includes applying at least one bloom filter to identify one of the second plurality of data objects that might be in the data lake and performing a deduplication lookup in the data lake for the one of the second plurality of data objects; augmenting each of the second plurality of data objects with a corresponding description organized according to at least one of the one or more schemas; and storing the second plurality of data objects and a corresponding plurality of descriptions according to the one or more schemas with the first plurality of data objects in the data lake.

The computer program product may further include code that performs the steps of: searching the data lake for one or more security events of interest; and, in response to data obtained while searching the data lake, directly querying at least one of the endpoints for additional information.

In one aspect, a method disclosed herein may include storing a data lake containing a first plurality of data objects representing security events and a plurality of descriptions for the first plurality of data objects, each of the plurality of descriptions organized according to one or more schemas; receiving a second plurality of data objects in an asynchronous stream of security events from an enterprise network; filtering the second plurality of data objects to remove duplicate data objects already included in the first plurality of data objects; augmenting each of the second plurality of data objects with a corresponding description organized according to at least one of the one or more schemas; and storing the second plurality of data objects and a corresponding plurality of descriptions according to the one or more schemas with the first plurality of data objects in the data lake.

The data objects may include security events from one or more endpoints in the enterprise network. At least one of the first plurality of data objects and the second plurality of data objects may include security events from one or more data recorders on endpoints in the enterprise network. The asynchronous stream may include at least one of a batch transfer including a group of security events, a streaming transfer of one or more individual security events, and a connectivity-dependent transfer. Filtering may include applying a bloom filter to detect a first group of the second plurality of data objects that are definitely not in the data lake and a second group of the second plurality of data objects that might be in the data lake. The method may further include performing a deduplication lookup in the data lake on each of the second group. One of the schemas may include a global schema for all of the data objects in the data lake. One of the schemas may include a device-dependent schema selected for one of the data objects according to a source of the one of the data objects when received in the asynchronous stream. One or more schemas may be columnar schemas. The method may further include programmatically listening to each of the second plurality of data objects based on at least one of the one or more schemas as each of the data objects is stored in the data lake to identify one or more security events of interest. The method may further include, in response to identifying a security event of interest, directly querying at least one endpoint in the enterprise network for additional information. The method may further include searching the data lake for one or more security events of interest. The method may further include, in response to data obtained while searching the data lake, directly querying at least one endpoint in the enterprise network for additional information.

In one aspect, a system disclosed herein may include: a data lake including a data storage medium storing a first plurality of data objects representing security events within an enterprise network and a plurality of descriptions for the first plurality of data objects, each of the plurality of descriptions organized according to one or more schemas; a stream service configured to receive an asynchronous event stream of additional data objects representing security events from the enterprise network; and a transformer service configured to process the asynchronous event stream by filtering the additional data objects to remove duplicate one or more data objects already stored in the data lake, thereby providing filtered data objects, to augment each of the filtered data objects with a corresponding description organized according to one of the one or more schemas, thereby providing augmented data objects, and to store the augmented data objects in the data lake.

The asynchronous event stream may include at least one of a batch transfer including a group of security events, a streaming transfer of one or more individual security events, and a connectivity-dependent transfer. Filtering the additional data objects may include applying a bloom filter to the asynchronous event stream to detect a first group of the additional data objects that are definitely not in the data lake and a second group of the additional data objects that might be in the data lake. The transformer service may be further configured to perform a deduplication lookup in the data lake on each of the second group of the additional data objects. The system may further include a query engine configured to search the data lake for one or more security events of interest.

An aspect of the present teachings is directed to live discovery of enterprise threats based on security query activity. A threat management system provides a collection of queries for investigating security issues within an enterprise. Useful inferences are drawn about the value of different queries, and about the security posture of the enterprise, by monitoring contextual activity such as the popularity and context of query usage, patterns of end user modification to queries, and post-query activity.

In one aspect, a computer program product disclosed herein may include computer executable code embodied in a non-transitory computer readable medium that, when executing on one or more computing devices, performs the steps of: receiving an event stream including security events from an enterprise network at a stream service; storing the event stream in a data lake; storing a plurality of queries for execution against the event stream, the plurality of queries configured to investigate security issues within the enterprise network based on the event stream; monitoring a usage of the plurality of queries at one or more administrative consoles to a threat management facility for the enterprise network; determining a usage history based on the usage of the plurality of queries; and initiating an action by the threat management facility based on the usage history. The event stream may include security events from one or more sensors on compute instances in the enterprise network.

In one aspect, a method disclosed herein may include: storing an event stream including security events from one or more sensors on compute instances in an enterprise network; storing a plurality of queries for execution against the event stream, the plurality of queries configured to investigate security issues within the enterprise network based on the event stream; monitoring a usage of the plurality of queries; determining a usage history based on the usage of the plurality of queries; and initiating an action by a threat management facility based on the usage history. Storing the event stream may include storing the event stream in a data lake. Monitoring the usage may include monitoring queries initiated at one or more administrative consoles for the threat management facility. Monitoring the usage may include monitoring queries for a plurality of enterprise networks. Monitoring the usage may include monitoring changes to one or more of the plurality of queries. Monitoring the usage may include monitoring post-query remediation activity initiated at one or more administrative consoles. The usage history may include a popularity of one or more of the plurality of queries. The usage history may include a pattern of changes to one or more of the plurality of queries. The usage history may include a pattern of post-query activities initiated from an administrative console. The usage history may include a context for executing one or more of the plurality of queries. Initiating the action may include identifying a pattern of queries associated with a known threat and generating a recommendation for one or more responsive actions. Initiating the action may include evaluating a usefulness of one of the plurality of queries based on a pattern of post-query activity. Initiating the action may include evaluating a usefulness of one of the plurality of queries based on a pattern of query modifications by users.

In one aspect, a system disclosed herein may include: a data lake storing an event stream including security events from one or more sensors on compute instances in an enterprise network; an administrative console for executing queries against the event stream; a database storing a plurality of queries for execution against the event stream at the administrative console, the plurality of queries configured to investigate security issues within the enterprise network based on the event stream; and a query monitoring agent configured to monitor a usage of the plurality of queries at the administrative console, to determine a usage history based on the usage of the plurality of queries, and to initiate an action by a threat management facility based on the usage history.

The usage history may include a popularity of one or more of the plurality of queries. The usage history may include a pattern of changes to one or more of the plurality of queries. The usage history may include a pattern of post-query activities initiated from the administrative console. The usage history may include a context for executing one or more of the plurality of queries.

An aspect of the present teachings is directed to data augmentation for threat investigation in an enterprise network. An endpoint in an enterprise network is instrumented with sensors to detect security-related events occurring on the endpoint. Event data from these sensors is augmented with contextual information about, e.g., a source of each event in order to facilitate improved correlation, analysis, and visualization at a threat management facility for the enterprise network.

In one aspect, a computer program product disclosed herein may include computer executable code embodied in a non-transitory computer readable medium that, when executing on one or more computing devices, performs the steps of: receiving event data from a sensor on an endpoint, the event data responsive to an event on the endpoint; generating a source identifier that identifies a source of the event in a context of the sensor, the source identifier including a medium access control address associated with the source, an internet protocol address associated with the source, and a process executing on the endpoint that is associated with the source; creating a modified event record that includes the event data and the source identifier; storing the modified event record in a data recorder on the endpoint; and transmitting the modified event record to a threat management facility.

The computer program product may further include code that performs the step of storing a plurality of modified event records in the data recorder. The computer program product may further include code that performs the step of responding to a query from a resource external to the endpoint for data stored in the data recorder. The computer program product may further include code that, when executing on the threat management facility, performs the step of providing a user interface for navigating a chain of events based on relationships among a plurality of source identifiers in a plurality of modified event records received at the threat management facility. The computer program product may further include code that, when executing on the threat management facility, performs the step of processing a stream of modified event records to evaluate security threats to an enterprise network. The computer program product may further include code that performs the step of processing a stream of modified event records at the threat management facility to evaluate a security state of the endpoint.

In one aspect, a method disclosed herein may include: instrumenting an endpoint with a sensor and a local security agent, the sensor configured to generate an event record in response to an event, and the local security agent configured to locally receive the event record from the sensor; appending a source identifier to the event record that identifies a source of the event in a context of the sensor, the source identifier including a physical address associated with the source, a network address associated with the source, and at least one temporal address assigned by the endpoint to the source of the event, thereby providing a modified event record including the event record and the source identifier; and transmitting the modified event record to a threat management facility.

The method may further include determining a relationship of the modified event record with one or more other modified event records stored at the threat management facility based on the source identifier. The method may further include determining a relationship of the source identifier with one or more other source identifiers based on a plurality of modified event records received at the threat management facility. The method may further include creating a graph that causally associates two or more events based on a plurality of source identifiers in a plurality of modified event records received at the threat management facility. The method may further include providing a user interface for navigating a chain of events based on relationships among a plurality of source identifiers in a plurality of modified event records received at the threat management facility. The method may further include storing a plurality of modified event records on a data recorder for the endpoint, the data recorder configured to respond to queries for event data from the threat management facility. The physical address may include a medium access control address and the network address includes an internet protocol address. The method may further include determining the context of the sensor by inspecting one or more network resources associated with the endpoint. The temporal address may include an identifier for at least one of a user of the endpoint, a device associated with the endpoint, a path associated with a computing object on the endpoint, a process executing on the endpoint, and an application on the endpoint. The method may further include processing a stream of modified event records at the threat management facility to evaluate security threats to an enterprise network. The method may further include processing a stream of modified event records at the threat management facility to evaluate a security state of the endpoint. The method may further include processing a stream of modified event records at the threat management facility to deduplicate one or more event records base on a reconciliation of source identifiers.

In one aspect, a system disclosed herein may include a local security agent executing on an endpoint, the local security agent configured to: receive data characterizing an event from a sensor on the endpoint; generate an event record in response to the event; determine a context of the sensor including a physical address associated with a source of the event and a temporal address assigned by the endpoint to the source of the event; append a source identifier to the event record that identifies the source of the event including the context of the sensor, thereby providing a modified event record including the event record and the source identifier; and transmit the modified event record to a remote resource.

The system may further include a threat management facility configured to receive a stream of modified event records from a plurality of endpoints in an enterprise network that includes the endpoint, and to evaluate security threats to the enterprise network based on the stream of modified event records.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 16 shows a method for discovery of enterprise threats based on security query activity.

FIG. 17 shows a method for augmenting data for use in threat investigation.

DESCRIPTION

Figure 1:
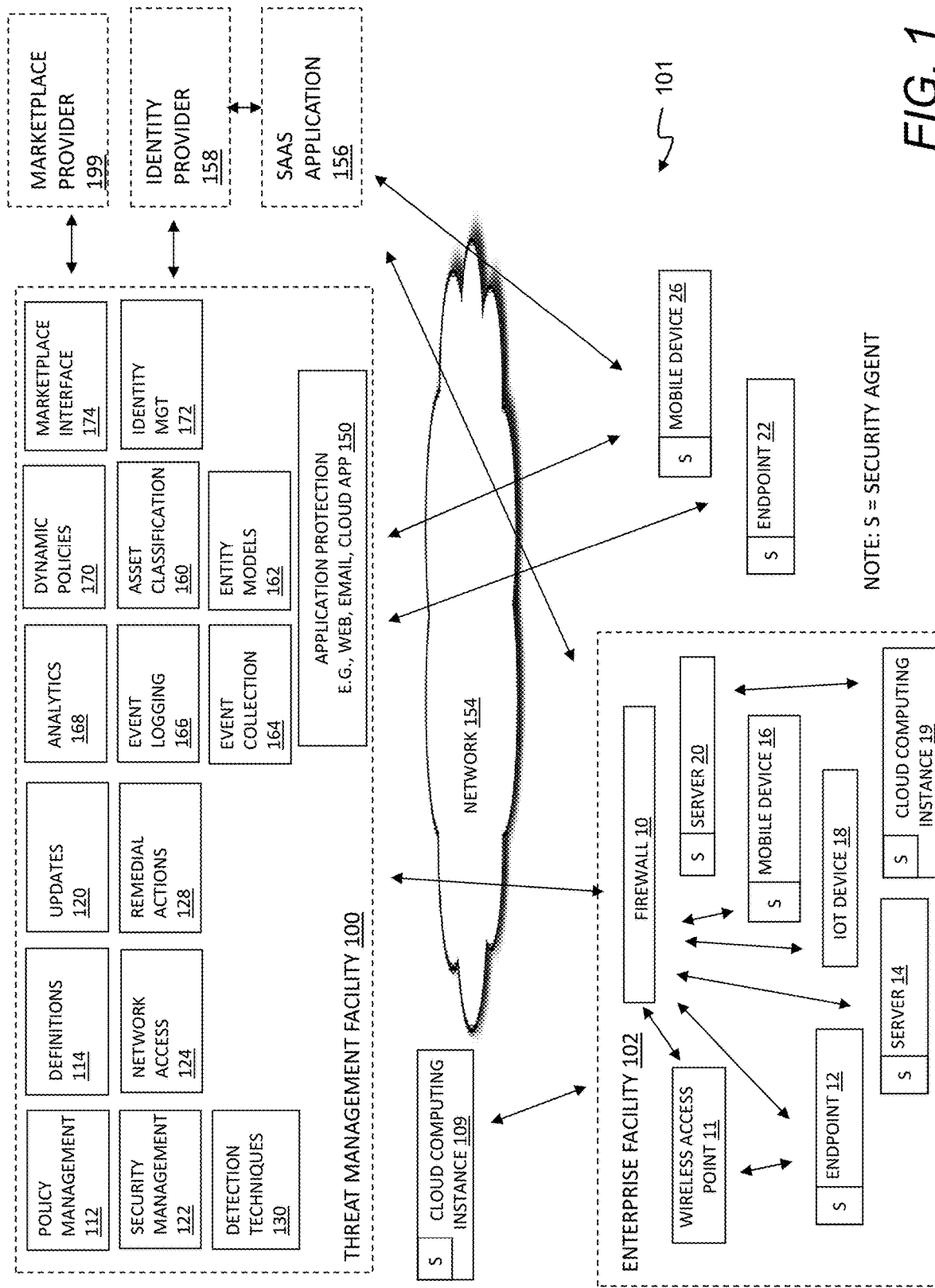
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance within the enterprise facility. Some or all of one or more of the facilities 100, 112-174 may be provided on the same physical hardware or logical resource as a gateway, such as a firewall or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware.

Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
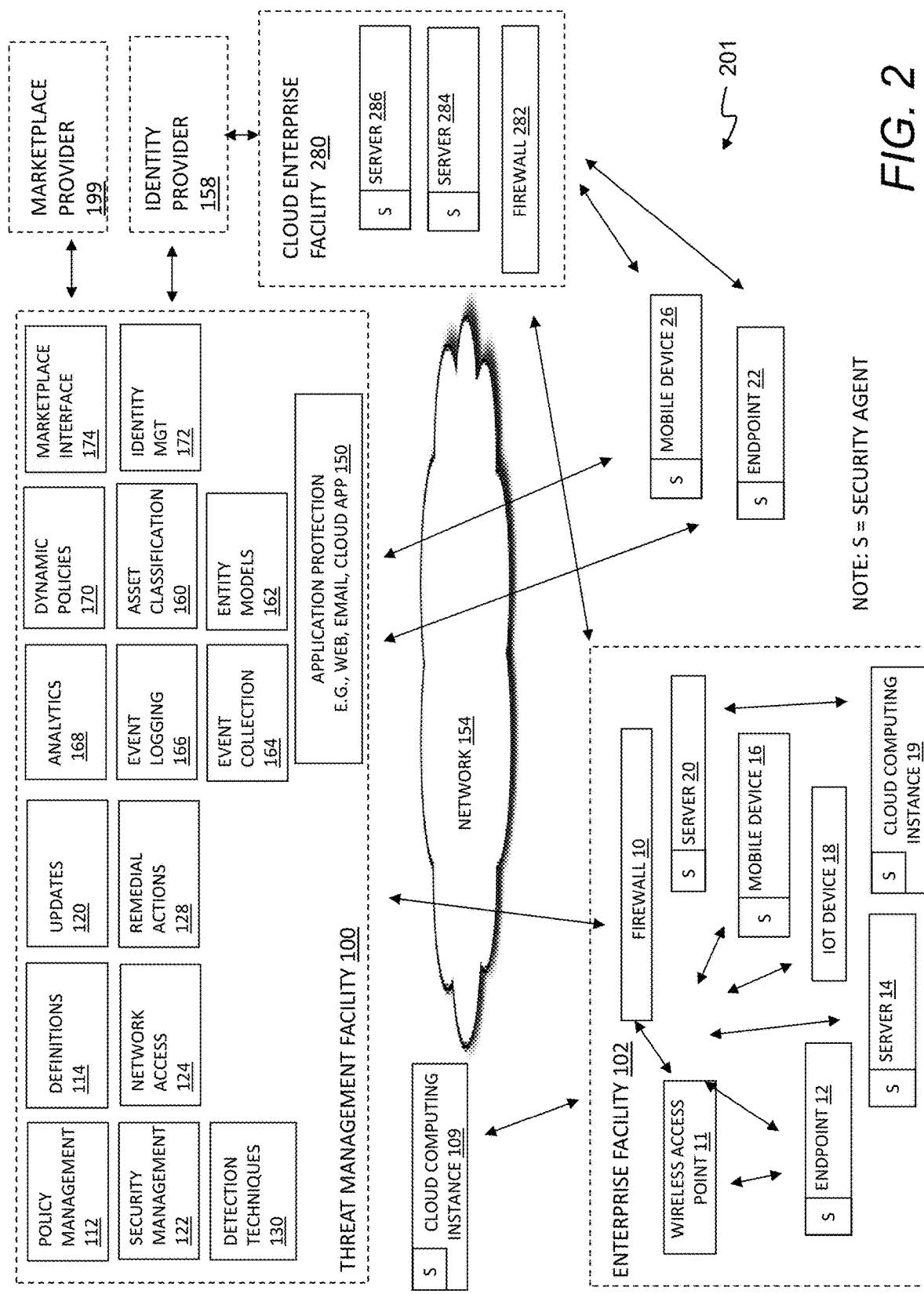
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
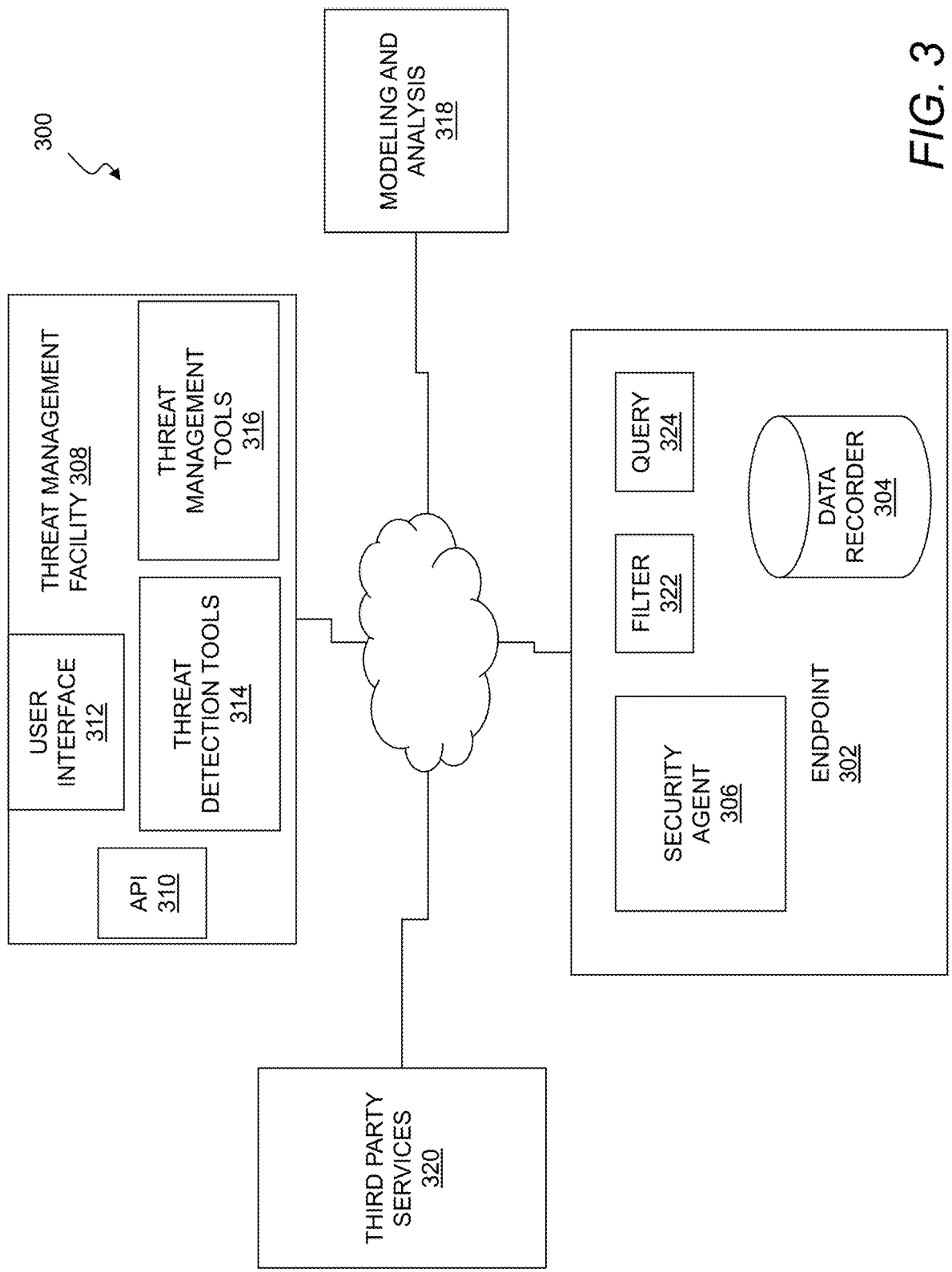
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
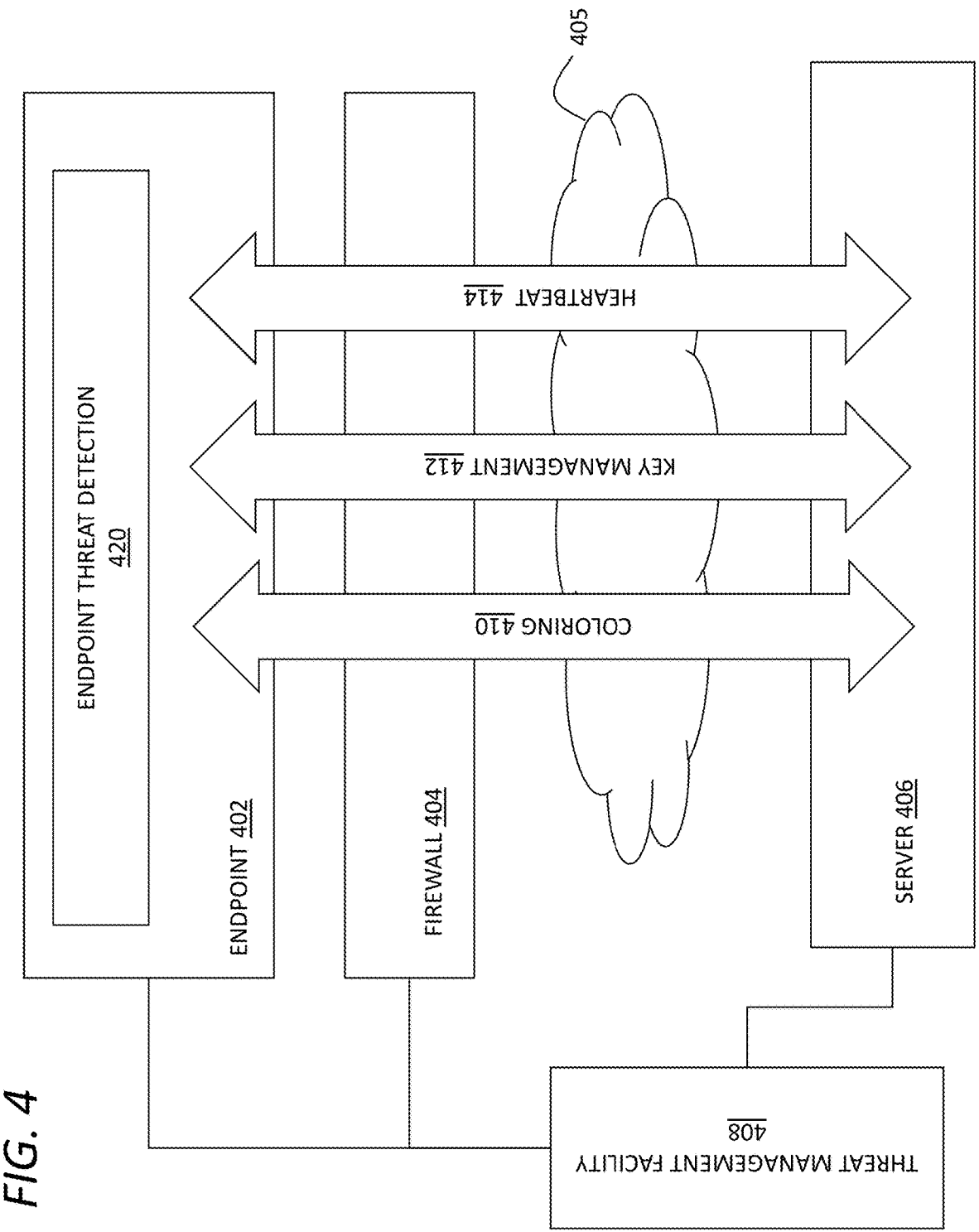
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
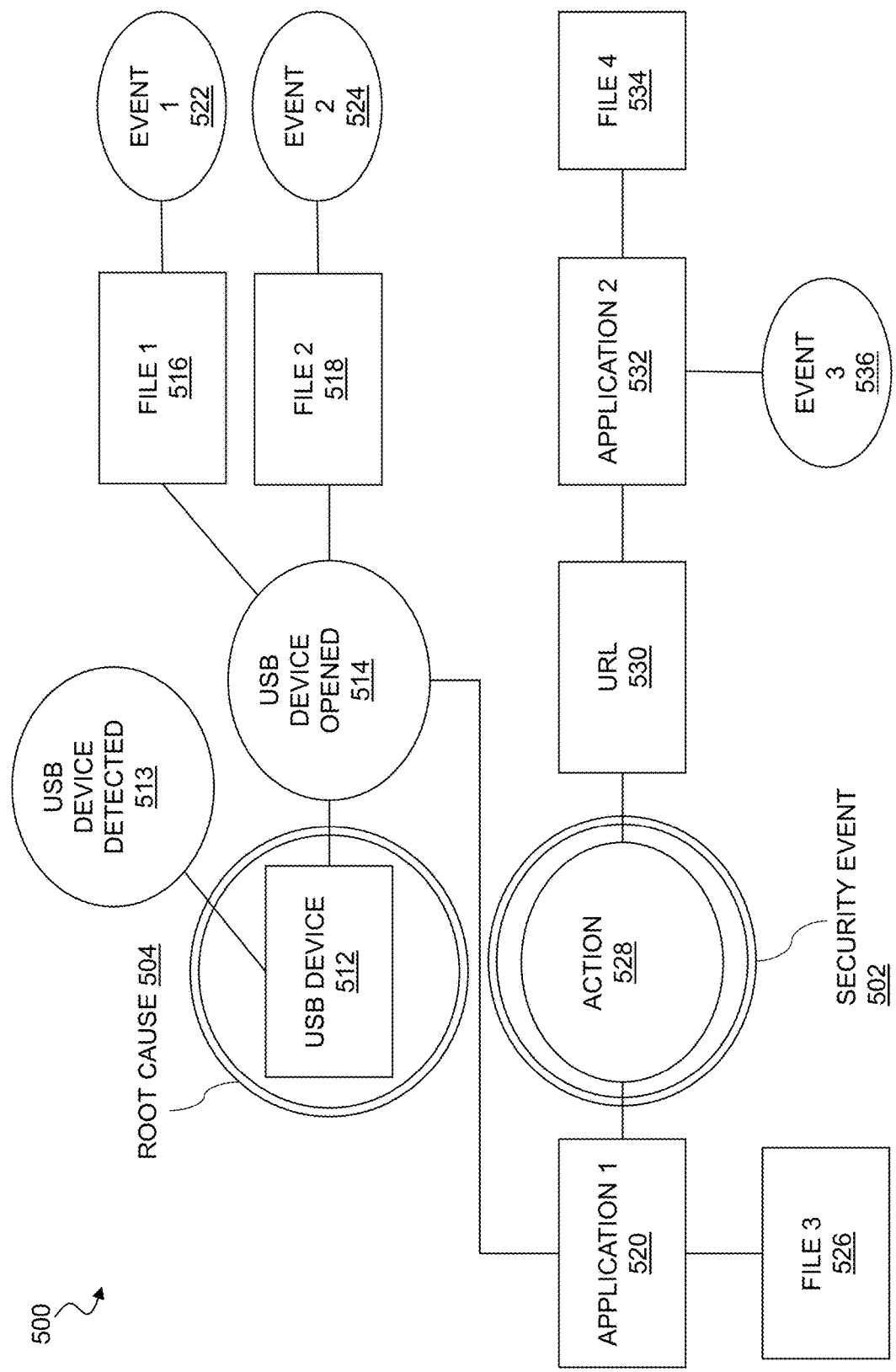
FIG. 5 illustrates an event graph stored by a data recorder.

FIG. 5 illustrates an event graph 500 stored by a data recorder such as any of the data recorders described herein. The event graph 500 may include a sequence of computing objects causally related by a number of events, and which provide a description of computing activity on one or more endpoints. The event graph 500 may be generated, for example, when a security event 502 is detected on an endpoint, and may be based on a data log or similar records obtained by an event data recorder during operation of the endpoint. The event graph 500 may be used to determine a root cause 504 of the security event 502 as generally described above. The event graph 500 may also or instead be continuously generated to serve as, or be a part of, the data log obtained by the data recorder. In any case, an event graph 500, or a portion of an event graph 500 in a window before or around the time of a security event, may be obtained and analyzed after a security event 502 occurs to assist in determining its root cause 504. The event graph 500 depicted in the figure is provided by way of example only, and it will be understood that many other forms and contents for event graphs 500 are also or instead possible. It also will be understood that while the figure illustrates a graphical depiction of an event graph 500, the event graph 500 may be stored in any suitable data structure or combination of data structures suitable for capturing the chain of events and objects in a manner that preserves causal relationships for use in forensics and malware detection as contemplated herein.

By way of example, the event graph 500 depicted in the figure begins with a computing object that is a USB device 512, which may be connected to an endpoint. Where the USB device 512 includes a directory or file system, the USB device 512 may be mounted or accessed by a file system on an endpoint to read contents. The USB device 512 may be detected 513 and contents of the USB device 512 may be opened 514, e.g., by a user of the endpoint or automatically by the endpoint in response to detection of the USB device 512. The USB device 512 may include one or more files and applications, e.g., a first file 516, a second file 518, and a first application 520. The first file 516 may be associated with a first event 522 and the second file may be associated with a second event 524. The first application 520 may access one or more files on the endpoint, e.g., the third file 526 shown in the figure. The first application 520 may also or instead perform one or more actions 528, such as accessing a URL 530. Accessing the URL 530 may download or run a second application 532 on the endpoint, which in turn accesses one or more files (e.g., the fourth file 534 shown in the figure) or is associated with other events (e.g., the third event 536 shown in the figure).

In the example provided by the event graph 500 depicted in the figure, the detected security event 502 may include the action 528 associated with the first application 520, e.g., accessing the URL 530. By way of example, the URL 530 may be a known malicious URL or a URL or network address otherwise associated with malware. The URL 530 may also or instead include a blacklisted network address that although not associated with malware may be prohibited by a security policy of the endpoint or enterprise network in which the endpoint is a participant. The URL 530 may have a determined reputation or an unknown reputation. Thus, accessing the URL 530 can be detected through known computing security techniques.

In response to detecting the security event 502, the event graph 500 may be traversed in a reverse order from a computing object associated with the security event 502 based on the sequence of events included in the event graph 500. For example, traversing backward from the action 528 leads to at least the first application 520 and the USB device 512. As part of a root cause analysis, one or more cause identification rules may be applied to one or more of the preceding computing objects having a causal relationship with the detected security event 502, or to each computing object having a causal relationship to another computing object in the sequence of events preceding the detected security event 502. For example, other computing objects and events may be tangentially associated with causally related computing objects when traversing the event graph 500 in a reverse order—such as the first file 516, the second file 518, the third file 525, the first event 522, and the second event 524 depicted in the figure. In an aspect, the one or more cause identification rules are applied to computing objects preceding the detected security event 502 until a cause of the security event 502 is identified.

In the example shown in the figure, the USB device 512 may be identified as the root cause 504 of the security event 502. In other words, the USB device 512 was the source of the application (the first application 520) that initiated the security event 502 (the action 528 of accessing the potentially malicious or otherwise unwanted URL 530).

The event graph 500 may similarly be traversed going forward from one or more of the root cause 504 or the security event 502 to identify one or more other computing objects affected by the root cause 504 or the security event 502. For example, the first file 516 and the second 518 potentially may be corrupted because the USB device 512 included malicious content. Similarly, any related actions performed after the security event 502 such as any performed by the second application 532 may be corrupted. Further testing or remediation techniques may be applied to any of the computing objects affected by the root cause 504 or the security event 502.

The event graph 500 may include one or more computing objects or events that are not located on a path between the security event 502 and the root cause 504. These computing objects or events may be filtered or 'pruned' from the event graph 500 when performing a root cause analysis or an analysis to identify other computing objects affected by the root cause 504 or the security event 502. For example, computing objects or events that may be pruned from the event graph 500 may include the USB drive 510 and the USB device being detected 513.

It will be appreciated that the event graph 500 depicted in FIG. 5 is an abstracted, simplified version of actual nodes and events on an endpoint for demonstration. Numerous other nodes and edges will be present in a working computing environment. For example, when a USB device is coupled to an endpoint, the new hardware will first be detected, and then the endpoint may search for suitable drivers and, where appropriate, present a user inquiry of how the new hardware should be handled. A user may then apply a file system to view contents of the USB device and select a file to open or execute as desired, or an autorun.exe or similar file may be present on the USB device that begins to execute automatically when the USB device is inserted. All of these operations may require multiple operating system calls, file system accesses, hardware abstraction layer interaction, and so forth, all of which may be discretely represented within the event graph 500, or abstracted up to a single event or object as appropriate. Thus, it will be appreciated that the event graph 500 depicted in the drawing is intended to serve as an illustrative example only, and not to express or imply a particular level of abstraction that is necessary or useful for root cause identification as contemplated herein.

The event graph 500 may be created or analyzed using rules that define one or more relationships between events and computing objects. The C Language Integrated Production System (CLIPS) is a public domain software tool intended for building expert systems, and may be suitably adapted for analysis of a graph such as the event graph 500 to identify patterns and otherwise apply rules for analysis thereof. While other tools and programming environments may also or instead be employed, CLIPS can support a forward and reverse chaining inference engine suitable for a large amount of input data with a relatively small set of inference rules. Using CLIPS, a feed of new data can trigger a new inference, which may be suitable for dynamic solutions to root cause investigations.

An event graph such as the event graph 500 shown in the figure may include any number of nodes and edges, where computing objects are represented by nodes and events are represented by edges that mark the causal or otherwise directional relationships between computing objects such as data flows, control flows, network flows and so forth. While processes or files are common forms of nodes that might appear in such a graph, any other computing object such as an IP address, a registry key, a domain name, a uniform resource locator, a command line input or other object may also or instead be designated to be a node in an event graph as contemplated herein. Similarly, while an edge may be formed by an IP connection, a file read, a file write, a process invocation (parent, child, etc.), a process path, a thread injection, a registry write, a domain name service query, a uniform resource locator access and so forth other edges may be designated. As described above, when a security event is detected, the source of the security event may serve as a starting point within the event graph 500, which may then be traversed backward to identify a root cause using any number of suitable cause identification rules. The event graph 500 may then usefully be traversed forward from that root cause to identify other computing objects that are potentially tainted by the root cause so that a more complete remediation can be performed.

Figure 6:
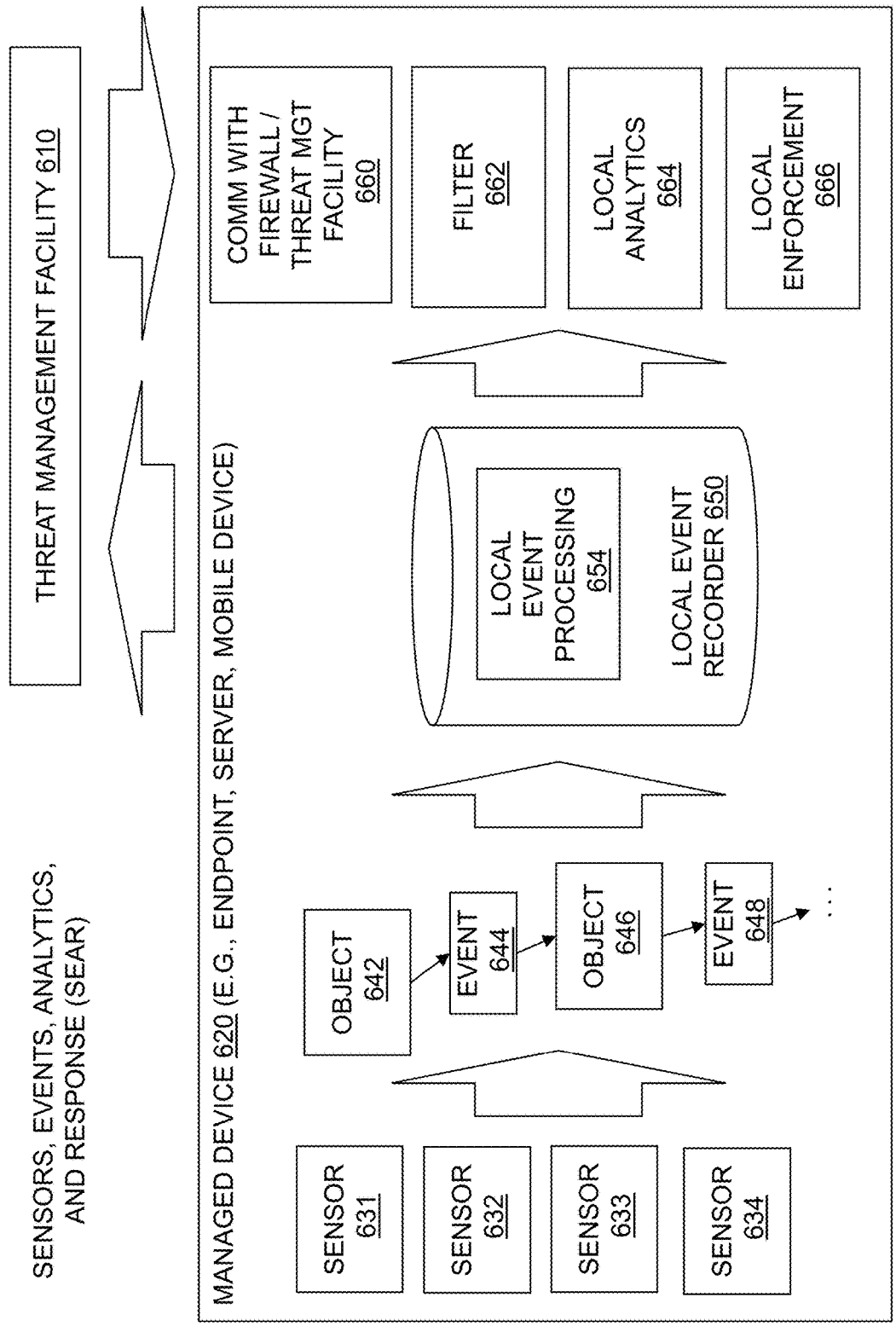
FIG. 6 depicts a Sensors, Events, Analytics, and Response (SEAR) environment.

FIG. 6 depicts a Sensors, Events, Analytics, and Response (SEAR) environment, which may be used on a compute instance 620 such as a managed device. The compute instance 620 may include sensors 631, 632, 633, 634 that produce data that are recognized as events according to the entity model. The sensors 631, 632, 633, 634 thus are sources of event information. The output of sensors 631, 632, 633, 644 may be objects 642 that are recognized as events 644. There may be multiple objects 642, 646 and events 644, 648 provided by a sensor. The events may be processed by a local event processing facility 654. The event processing may perform tokenizing and processing. Some events may be recognized and evaluated in real-time, other events may be evaluated in the context of other events. This may be stream or bulk processing. Events may have attributes (e.g., mandatory, optional (e.g., best effort), sensitive (tokenize it in local event store)), or associated contextual information.

A local event recorder 650 may be part of the event logging facility. Some recorded events may be stored locally and some may be communicated to another compute instance, such as the cloud. Some events will all be sent in real time, some only stored locally (and should be retrievable). An event filter 662 may be used to parse the events. Local analytics 664 on a compute instance may be used to locally identify events of interest. A communication facility 660 will communicate events to a central event store, such as a threat management facility 610, which may be a cloud facility. Local enforcement 666 may be used to take steps in response to events, as determined by the policy management facility 666. In embodiments, events can have attributes (e.g., mandatory, optional (e.g., best effort), sensitive (e.g., tokenize it in local event store)). Some events will all be sent in real time, some only stored locally (and should be retrievable).

A goal may be to discover as much as we can about the assets in the enterprise, and reduce surprises, such as compute instances that network administrators are not aware of, or unpatched compute instances, or valuable data leaving the enterprise.

As one non-limiting example, static policies may be assigned to access of files and data. Events involving files and data may be observed by sensors, for example, in a file system filter, generating events. The events may be determined to be of interest based on the policies.

Figure 7:
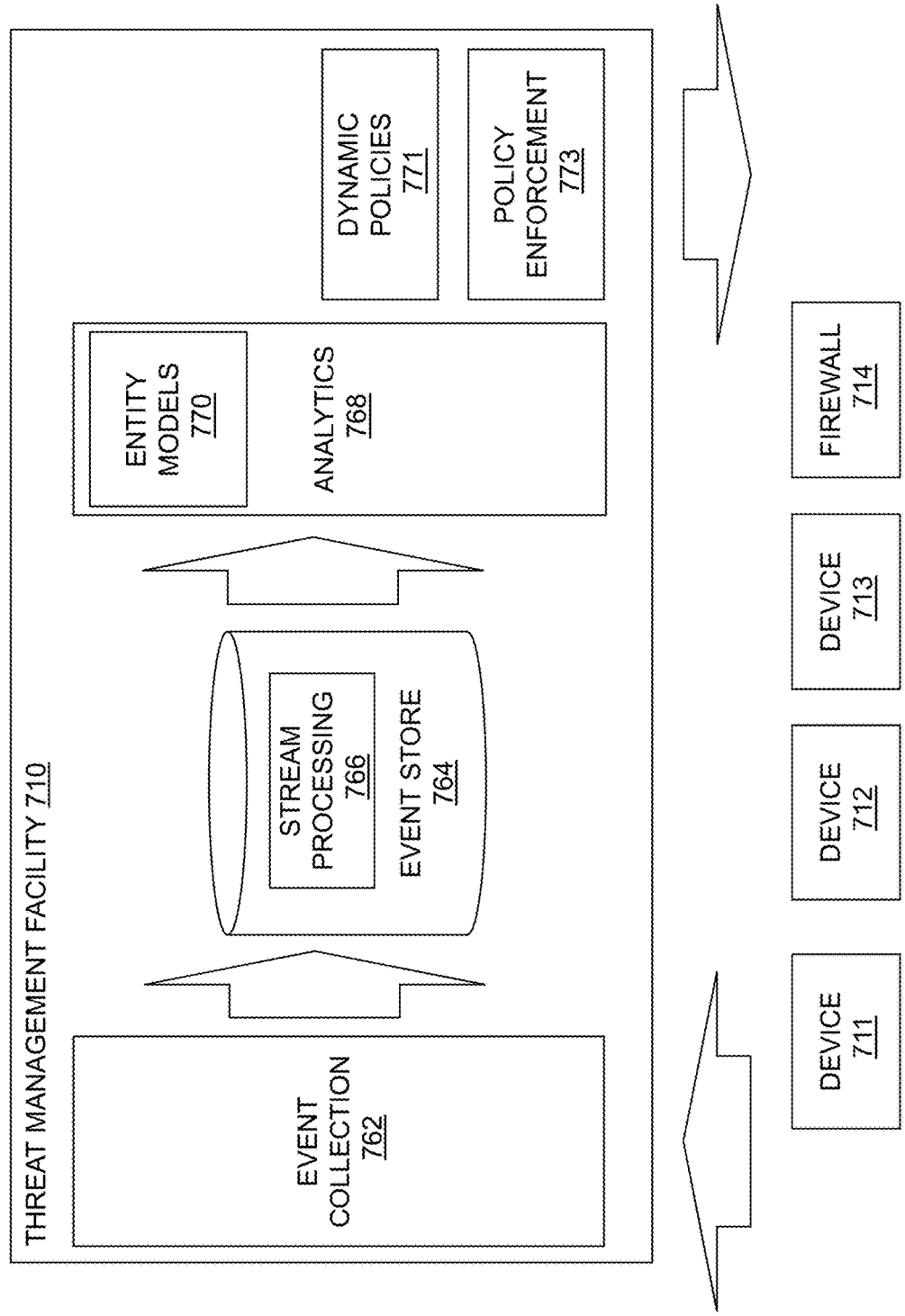
FIG. 7 depicts centralized event collection.

FIG. 7 depicts centralized event collection. Referring to FIG. 7, centralized event collection 700 may be used to receive and store events from various compute instances. Events are received at a threat management facility 710 by event collection 762. Events may be received from compute instances, shown for the sake of clarity of illustration as a device 711, a device 712, a device 713, and a firewall 714, although events may be received from any number or type of compute instances. Events may be stored in the event store 764, and also may be processed in real-time by the stream processing facility 766. The entity models 770 may be used by the analytics facility 768 to make observations and inferences based on the events.

In embodiments, events are continuously analyzed against a baseline. The baseline may be adjusted to account for normal behavior. Comparison to baselines may include looking for outliers and anomalies as well as impossible events. For example, if a user logs on from Germany and then logs in from San Francisco, that may be considered impossible. Comparisons may be made at different levels. For example, the entity may be compared to itself e.g., does this user on Monday compare to past activity. For example, the entity may be compared to its peer group, e.g., is a finance department member behaving similar to others. For example, the entity may be compared to other entities within the enterprise. For example, the entity may be compared to other users at similar enterprises in the same industry, or in the same location, as well as to the universe of all users.

Real-time and retrospective threat intelligence may also be included, as well as vulnerability information and patch information.

With a sufficient level of confidence in the inferences, active, adaptive responses may be taken. For example, dynamic policies 771 may be updated to better fit the security profile to the environment that has been discovered and observed, e.g., by adjusting security settings within a security policy or group of security policies. A policy enforcement facility 773 may enforce these updated dynamic policies 771 at compute instances, such as the compute instances 711-714.

In embodiments, high-interaction interfaces allow an admin to interact with the event store 764 to better understand the assets in the enterprise facility and for specific purposes, such as threat hunting.

Figure 8:
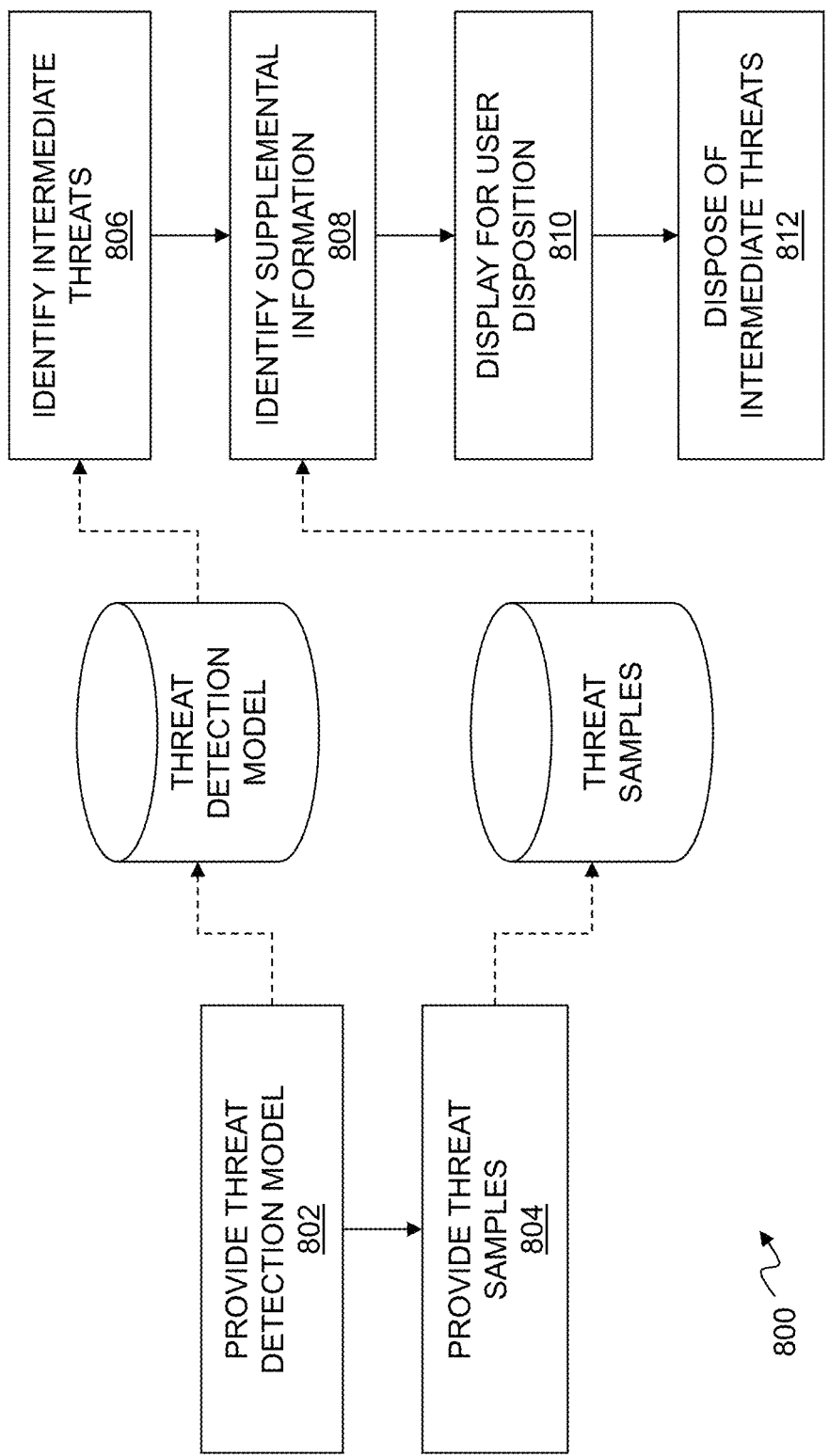
FIG. 8 shows a flow chart of a method for computer augmented threat evaluation.

FIG. 8 shows a flow chart of a method for computer augmented threat evaluation. In general, an automated system attempts to characterize code as safe or unsafe. For intermediate threat samples that are not placed with sufficient confidence in either category, human-readable analysis is automatically generated, such as qualitative or quantitative comparisons to previously categorized threat samples, in order to assist a human reviewer in reaching a final disposition. For example, a random forest over human-interpretable features may be created and used to identify suspicious features in a manner that is understandable to, and actionable by, a human reviewer. Similarly, a k-nearest neighbor algorithm or similar technique may be used to identify similar samples of known safe and unsafe code based on a model for one or more of a file path, a URL, an executable, and so forth. Similar code may then be displayed along with other information to a user for evaluation in a user interface. This comparative information can substantially improve the speed and accuracy of human interventions by providing richer context for human review of potential threats.

As shown in step 802, the method 800 may include providing a model such as a threat detection model for evaluating a likelihood that a threat sample is at least one of safe or malicious based on a training set of known threat samples. This may include any of the machine learning models or other threat detection models contemplated herein. As shown in step 804, the method 800 may also include providing threat samples such as samples of code that are known to be safe and samples of code that are known to be malicious. This may also or instead include known safe and unsafe samples of network activity, file content, file activity, behaviors, events, and so forth. The threat detection model may include a machine learning model trained using these threat samples, or any other suitable training set, or some combination of these. Thus, providing the model may include training a machine learning model to identify malicious code in a training set including threat samples that are known to be safe and known to be malicious.

The model may include a model for evaluating a likelihood that a threat sample is at least one of safe or malicious based on a training set of known threat samples. The model may also or instead include an integrative model that evaluates a potential threat by a threat sample based on a combination of a first model configured to identify malicious code based on behavioral tags, a second model configured to identify malicious code based on an executable file path, and a third model configured to identify malicious code based on a Uniform Resource Locator within the threat sample, or any of the other integrative models contemplated herein.

As shown in step 806, the method 800 may include identifying intermediate threats. For example, this may include identifying a new threat sample as an intermediate threat that is not within a predetermined likelihood of being malicious or safe according to the model, or using any of the other techniques described herein.

As shown in step 808, the method 800 may include identifying supplemental information relevant to evaluation of the new threat sample, such as relevant features of the new threat sample contributing to an inference of malicious code.

For example, the method 800 may include identifying one or more features, such as relevant features of the new threat sample associated with an inference of malicious code, using a random forest over human-interpretable features associated with an inference of malicious code in the training set of known threat samples (or any other suitable training set or the like). Random forests or random decision forests are an ensemble learning method for classification, regression, and other tasks, that operate by constructing a multitude of decision trees at training time and outputting the class that is the mode of the classes (classification) or mean prediction (regression) of the individual trees. As a significant advantage, the structure of the decision tree(s) can be organized around human-interpretable features such as whether a threat sample is signed or whether the threat sample opens new files during execution. While the creation of a random forest is generally computationally expensive, and other more efficient techniques are known for automated classification, the output of a random forest over human-interpretable features can provide highly useful context to a human reviewer when evaluating intermediate threats as contemplated herein, and thus provides particular advantages over other classification techniques in this context, even when used in addition to other (possibly more computationally efficient) classification models and techniques for evaluating riskiness of unknown threat samples.

Identifying supplemental information may also or instead include identifying similar threat samples known to be safe or malicious including one or more safe threat samples similar to the new threat sample and one or more malicious threat samples similar to the new threat sample. In this context, similarity may usefully be computed based on a k-nearest neighbor algorithm. The similar threat samples may, for example, include a list of safe threat samples ranked based on similarity to the new threat sample according to the k-nearest neighbor algorithm, which may in turn be presented as a ranked list in a user interface. The similar code may also or instead include a list of malicious threat samples ranked based on similarity to the new threat sample according to the k-nearest neighbor algorithm. Using these ranked lists, a user may advantageously be presented with an ordered list of nearest, known safe threat samples and nearest, known unsafe samples. A k-nearest neighbor algorithm is a non-parametric method that assigns a new item to a particular class based on a closest neighbor within a (usually multi-dimensional) features space for training data.

While this approach provides a computationally efficient technique for evaluating similarity for certain data types, it will be understood that other computational measures of similarity are known in the art, and may usefully be employed to evaluate similarity of a new threat sample to known safe an unsafe threat samples as contemplated herein. For example, a nearest centroid classifier or nearest prototype classifier uses a classification model that assigns a classification based on a closest centroid that may be used to assess similarity as contemplated herein. As another example, an n-gram analysis supports efficient approximate matching and may be used to perform fast, large scale similarity analysis for a given file path over a large database of known malicious and known benign file paths and URLs.

While certain portions of this description emphasize the analysis of executables for detection of suspiciousness or the identification of intermediate threats, it should be understood that the term "threat sample" is not so limited. Other threat samples based on, e.g., files, caches, or other data sources may be used. Events, e.g., in a filtered event stream may also or instead be used, and the techniques described herein for use with code samples are also generally applicable to other threat samples instead of explicit computer code such as network activity, content, event streams that identify activities or behaviors, and so forth. Thus for example, activities such as visiting a particular URL, opening an attachment, sending an electronic mail, or other events may also or instead be analyzed as threat samples by an integrative model or other threat detection tools to identify potential malware threats on an endpoint or group of endpoints.

As shown in step 810, the method 800 may include displaying the intermediate threat(s) and supplemental information in a user interface for user disposition, or otherwise augmenting a description of the new threat sample in a user interface with the supplemental information. This may, for example, include presenting a description of the new threat sample, the one or more relevant features, and the similar threat samples in a user interface. In one aspect, the method may include displaying a list of the similar threat samples ranked according to similarity to the new threat sample using, e.g., a k-nearest neighbor algorithm or any other suitable technique for measuring similarity. This may, for example, include similarity of executable code, similarity of behaviors, similarity of filenames, similarity of URL's called, or similarity of any other objective feature or combination of features that can be correlated to risk (or lack of risk). In one aspect, a number of the most similar safe samples and a number of the most similar unsafe samples may be presented together, and ranked, e.g., based on relative threat or based on similarity. The threat samples may be displayed along with descriptive information, attributes, behavioral characteristics, metadata and so forth, as well as any other information that might help a human user assess relative similarity when disposing of the current, new threat sample.

More generally, any supplemental information that might be helpful to a user in assessing a new threat sample may usefully be gathered and displayed to the user. For example, this may include augmenting the description of the new threat sample with a reputation of the new threat sample, e.g., based on reputation information available from a threat management facility. This may also or instead include augmenting the description of the new threat sample with a suspiciousness score based on a genetic analysis of features of the new threat sample. In another aspect, this may include augmenting the description of the new threat sample with contextual information such as users, related processes, associated data sources or files used by the threat sample, signature analysis, behavioral analysis, software update history or status for the endpoint, and so forth.

As shown in step 812, the method 800 may include disposing of the intermediate threat(s), such as by receiving user input through the user interface categorizing the new threat sample as safe, unsafe, or undetermined. Thus, in one aspect, the user interface may be configured to receive a user input categorizing the new threat sample as safe, unsafe, or undetermined. Where a disposition as unsafe does not automatically initiate a remedial action, the user interface may also be configured to receive an express instruction for a remedial action such as any of the remedial actions described herein, or any other actions suitable for disposing of or otherwise managing a new threat. In another aspect, the user interface may be configured to receive user input to adjust filtering of an event stream from an endpoint that provided the new threat sample, which may permit an increase or decrease in the amount of event reporting from the endpoint instead of, or in addition to, a specific characterization of the new threat sample.

In another aspect, a system as contemplated herein includes a memory storing a first model for evaluating a likelihood that a threat sample is at least one of safe or malicious, a second model characterizing a manner in which a number of human-interpretable features contribute to an evaluation of suspiciousness of a file, and a third model for evaluating similarity of threat samples. The system may include a threat management facility including a processor configured to apply the first model to identify a new threat sample as an intermediate threat when the new threat sample is not within a predetermined likelihood of being malicious or safe according to the first model. The system may also include a web server configured to present a user interface including a description of the intermediate threat, augmented by one or more features of the intermediate threat identified with the second model and one or more similar threat samples identified with the third model, the web server further configured to receive input from a user through the user interface disposing of the intermediate threat. Disposing of the intermediate threat may include remediating the intermediate threat. Disposing of the intermediate threat may also or instead include characterizing the intermediate threat as safe, unsafe, or undetermined.

Figure 9:
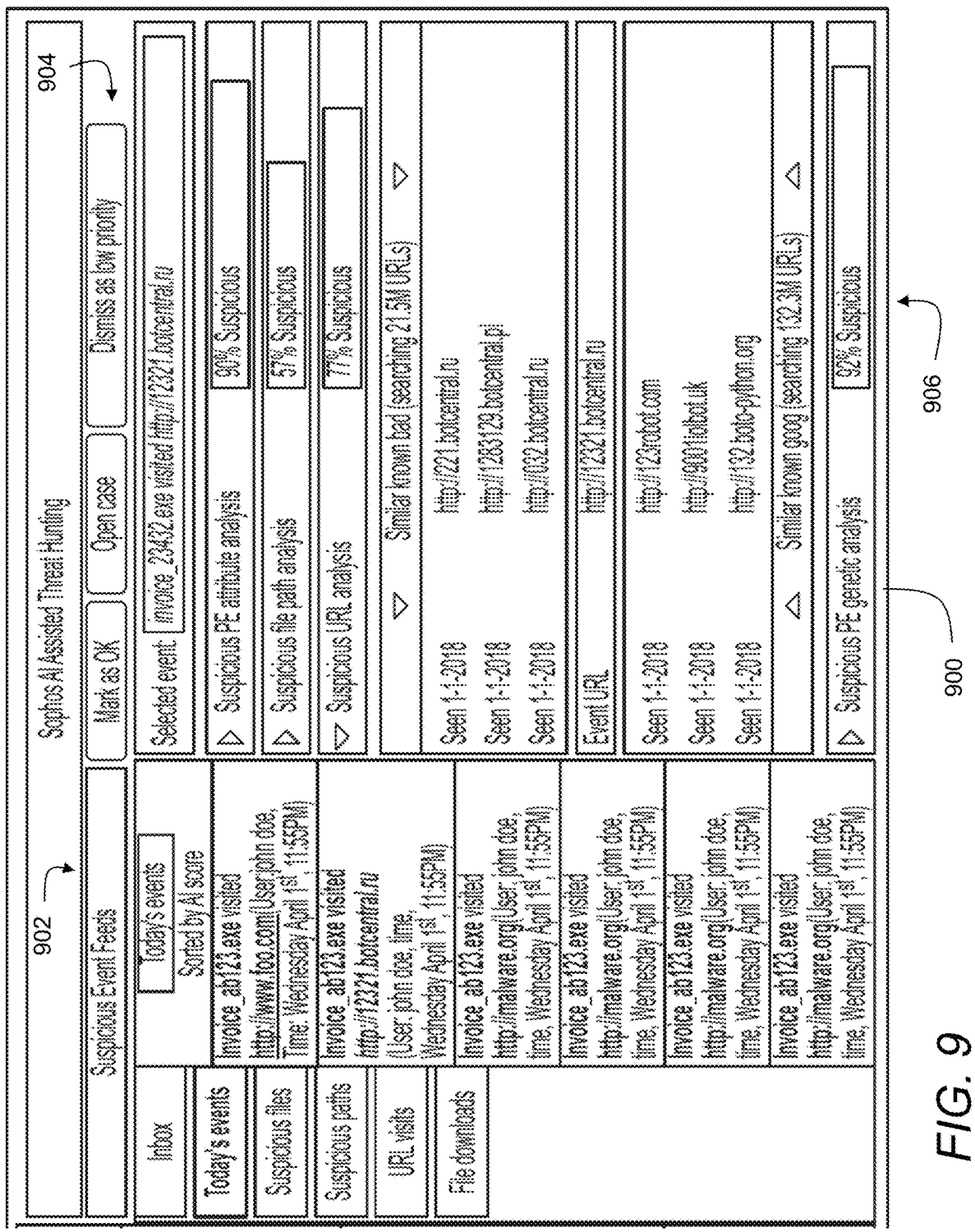
FIG. 9 shows a user interface for managing intermediate threats in an enterprise network.

FIG. 9 shows a user interface for managing intermediate threats in an enterprise network. The user interface 900 may be provided, e.g., as a web page or other content presented from the threat management facility for display on a user device such as an end user endpoint. The user interface 900 may show a feed 902 of suspicious events. The events within this feed 902 may be sorted, e.g., into files, URL visits, executables, processes, downloads, and so forth, or any other useful categories for review, or the events may be combined into a single feed. As noted above, threat samples may include executable code, however, the techniques contemplated herein may also or instead be applied to threat samples such as files, network activity, or streams of event data.

A variety of tools 904 for explicit disposition of new threat samples may be provided. For example, the user interface 900 may include tools 904 such as buttons or similar controls for a user to mark a particular event as, e.g., safe, unsafe, low priority, unknown, or the like. The user interface 900 may also provide controls for querying the enterprise network for additional information, for adjusting filtering of event streams from endpoint data recorders, for initiating scans or other analysis, and so forth.

In one aspect, the user interface 900 may display a window 906 with more granular information about features contributing to suspiciousness. For example, an analysis of a threat sample may return a 90% suspicion of malicious code, while a file path analysis may return a 57% suspicion, and a URL analysis may return a 77% suspicion. While an integrative model may combine these various features into a single estimate of suspiciousness or potential risk, the individual values may be useful to a user attempting to manually dispose of an intermediate threat. Furthermore, for any particular feature (e.g., the URL analysis in FIG. 9), a number of most similar events or threat samples for that feature may be displayed, with similarity evaluated using, e.g., a k-nearest neighbor algorithm or other algorithm for evaluating similarity within a feature space. These more granular estimates of suspiciousness may be presented in separate sub-windows, which may usefully be arranged in an accordion, a stacked group of drop-down lists, or any other suitable control element or combination of control elements that permits each type of estimate to be expanded or collapsed under user control.

Figure 10:
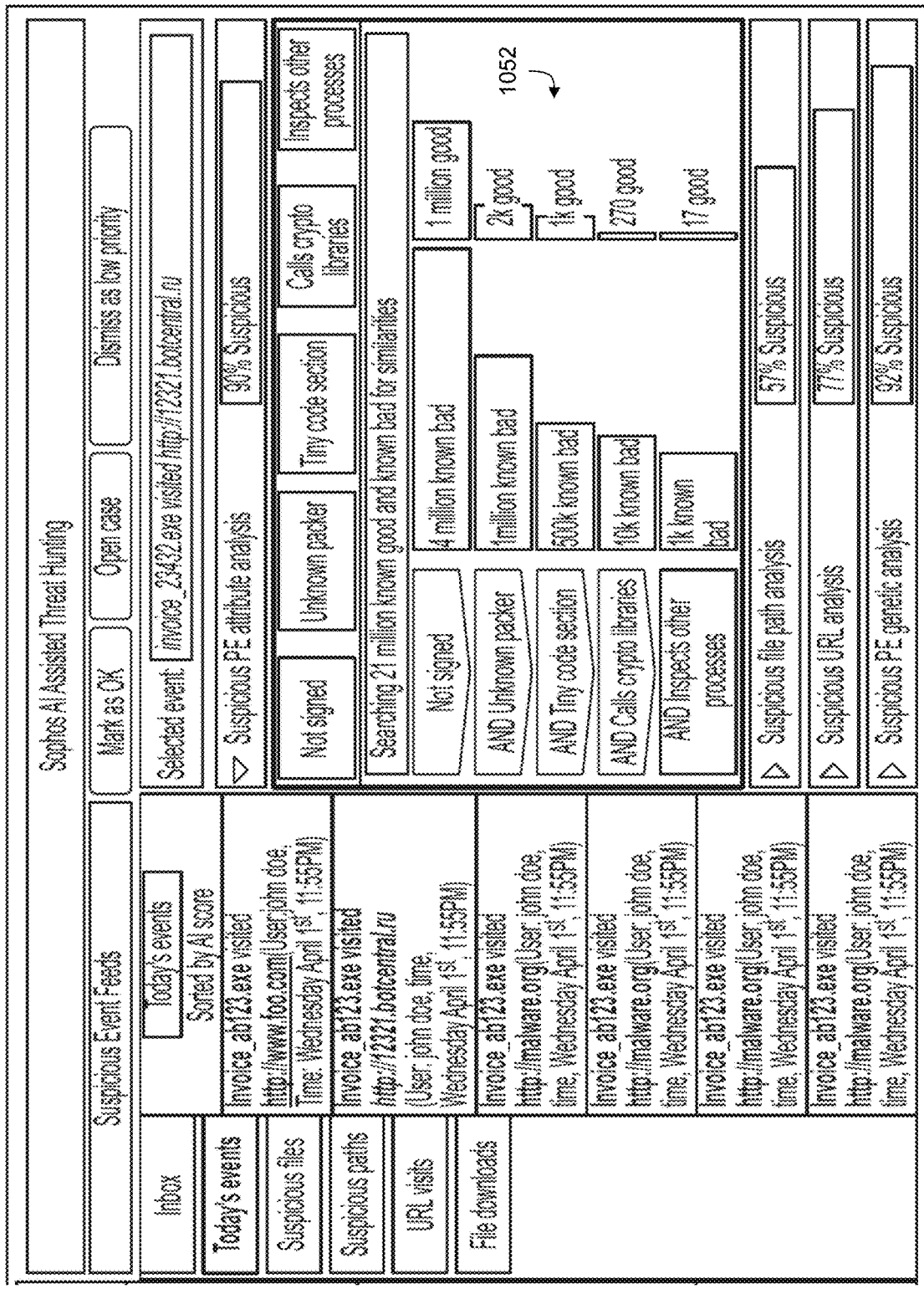
FIG. 10 shows a user interface for managing intermediate threats in an enterprise network.

FIG. 10 shows a user interface for managing intermediate threats in an enterprise network. The user interface 1050 may, for example, include any of the user interfaces described herein.

In one aspect, the user interface 1050 may show a window 1052 listing human interpretable features contributing to an estimate of suspiciousness. For example, the user interface 1050 may present particular features in the window 1052 such as whether a threat sample is signed, whether the threat sample calls cryptographic libraries, and whether the threat sample inspects other processes. For each such feature, the user interface 1050 may further present the number of known good and known bad threat samples for that feature, with the features progressively nested according to the hierarchy of a random decision forest.

The features displayed in this list may be a subset of features in a random forest over human-interpretable features that is selected based on relevance, e.g., how strongly indicative those features are of safety or suspiciousness. In one aspect, this may include features that are most heavily weighted on a percentage basis toward safety or suspiciousness. In another aspect, this may include features with the largest number of relevant samples (e.g., higher up the decision tree). In another aspect, these and any other factors may be weighted or otherwise collectively evaluated to select a subset of features for display to a user. This approach may usefully assist a human user when evaluating an intermediate threat for manual disposition by providing a display of features that contribute more significantly or most significantly to the potential risk associated with a threat sample.

In another aspect, the user interface may provide a display of the random forest output (e.g., quantitative data about various human-interpretable features), or a display of most similar safe and unsafe threat samples, or some combination of these. For example, the user interface may provide one or more user controls for the user to select among these different analyses, and/or other analyses, contextual information, or other supplemental information.

Figure 11:
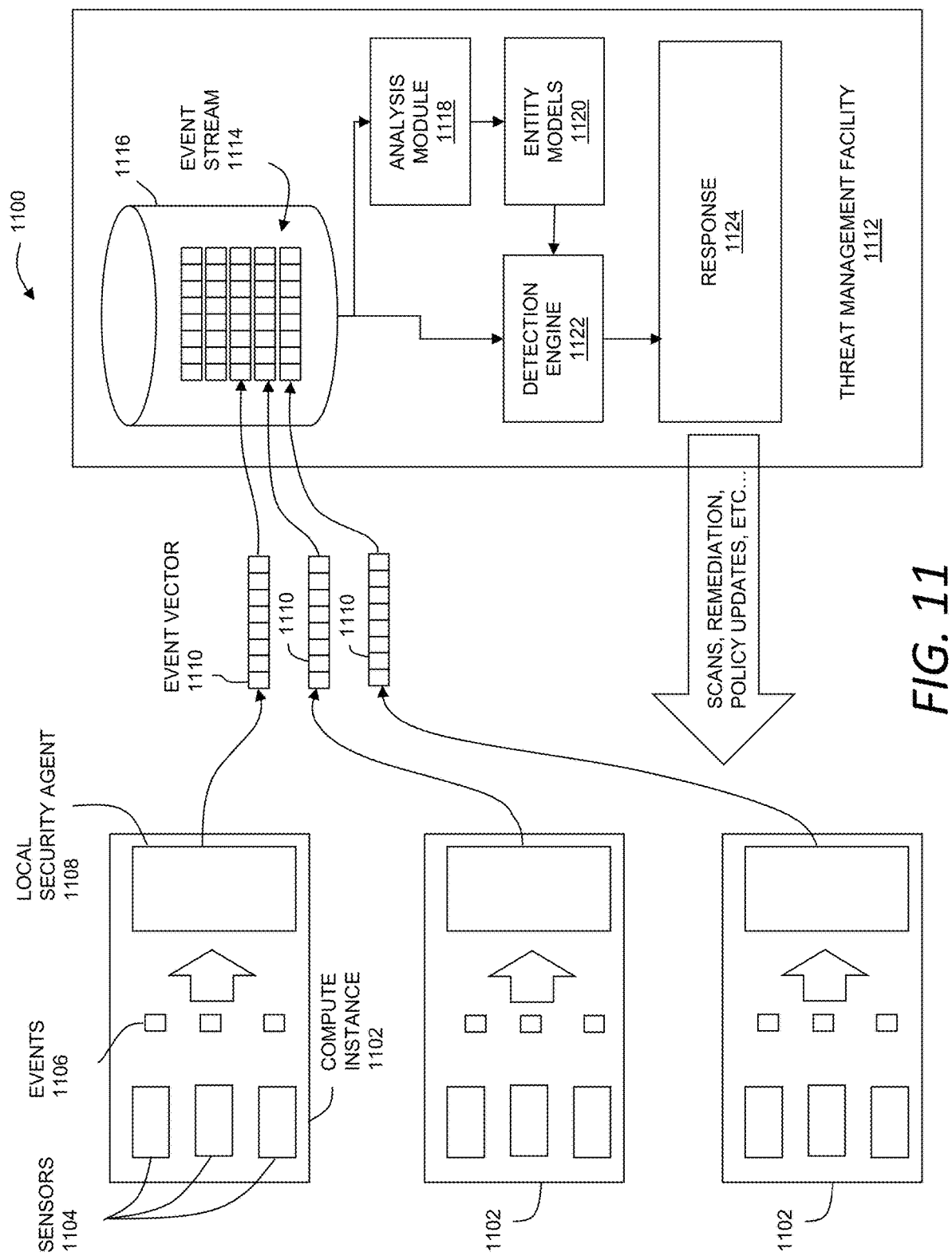
FIG. 11 shows a system for event monitoring and response.

FIG. 11 shows a system for event monitoring and response. In general, the system may include a number of compute instances 1102 that use local security agents 1108 to gather events 1106 from sensors 1104 into event vectors 1110, and then report these event vectors 1110 to a threat management facility 1112. The threat management facility 1112 may store the event vectors 1110 from a number of compute instances 1102 as a data stream 1114 in a data repository 1116 such as a memory or other data store of the threat management facility 1112. The event stream 1114 may be analyzed with an analysis module 1118, which may in turn create entity models 1120 useful for detecting, e.g., unexpected variations in behavior of compute instances 1102. A detection engine 1122 may be applied to the event stream 1114 in order to detect unusual or malicious activity, e.g. based on the entity models 1120 or any other techniques. Where appropriate, the threat management facility 1112 may deploy responses to the compute instances 1102 using a response facility 1124.

The compute instances 1102 may be any of the compute instances described herein, including without limitation any physical device such as a laptop, desktop, gateway, router, firewall, smartphone, tablet, or the like, as well as a virtualized instance of any of the foregoing or any other computer, user device, container, or the like. The sensors 1104 and events 1106 may also generally be any of the sensors and events described herein. The local security agent 1108 may be any of the security agents described herein, or any other software component or the like executing on or in association with one of the compute instances 1102 to locally manage security of the compute instance and/or coordinate security services with the threat management facility 1112 and other remote resources.

The local security agent 1108 may collect events 1106 from sensors 1104 on the compute instance 1102, and form the collected events 1106 into event vectors 1110 for communication to the threat management facility 1112. The sensors 1104 and/or local security agent 1108 may usefully process events 1106 in a number of ways in order to facilitate communication, computational efficiency, or downstream processing. For example, events 1106 may be tokenized. That is, a process that causes or creates an event 1106 may be assigned a number or other identifier, which may be used locally by a compute instance or globally within the enterprise to identify a particular, known process. An event 1106 may also encode (tokenized or otherwise) a relationship among different processes. For example, for a particular process that caused an event 1106, a parent-child relationship or other dependency with other processes may be encoded by providing process identifiers or the like within the event 1106, along with information characterizing the relationship among the processes. A Uniform Resource Locator or other information for identifying resources or network locations may also be tokenized or otherwise processed to support efficiency, consistency, and the like. For example, a URL may be encoded in an event 1106 as a hash of a URL, or as a portion of a URL, or some combination of these (e.g., a literal encoding of the top level domain, and a hash of some or all of the remaining path information). Other events 1106 such as registry changes, system calls, remote procedure calls and the like may be literally encoded into an event 1106 where they are relatively compact, or identified using any suitable tokenization, compression, or the like.

Other techniques may also or instead be used. For example, user-specific or machine-specific information may be altered where appropriate to anonymize the event vectors 1110 and mitigate exposure of sensitive information during network communications. An event vector 1110, or individual events 1106 therein, may also or instead be encrypted in order to secure the contents against malicious interception. In another aspect, the events 1106 or event vectors 1110 may be compressed to conserve network resources. The event vectors 1110 may also or instead be prioritized, e.g., in order to increase sensitivity and decrease response times for event vectors 1110 associated with a high likelihood of malicious activity. In this latter aspect, the local security agent 1108 may locally analyze events 1106 and/or event vectors 1110 in order to permit suitable prioritization, as well as to support local detection and response to malicious, or potentially malicious activity.

It will also be appreciated that events 1106 and/or event vectors 1110 may usefully be labelled in a variety of ways. While labeling with process identifiers is described above, this may also or instead include an identification of an entity associated with the event 1106 or event vector 1110. In this context, the entity may be any physical, logical, or conceptual entity useful for monitoring activity of compute instances 1102 as described herein. For example, the entity may include a user, a physical device, a virtualized machine, an operating system, an application, a process, a hardware subsystem (e.g., a network interface card, USB drive, camera, etc.), a network resource, a domain controller, a remote software service, and so forth. It should also be understood that the various entity types may be concurrently associated with a particular event 1106, sensor 1104, or event vector 1110, or particular events 1106 may be associated with multiple entities or event vectors 1110. Thus for example, storing a file may be an event 1106 associated with a particular user, a particular machine, a particular operating system, a particular physical storage device, and so forth.

In one aspect, the event vectors 1110 may be organized around entities. Thus for example, a request for access to a network resource may be an event 1106. When such a request is initiated by a user, an event vector 1110 for that user may be created and reported along with other temporally adjacent or otherwise related events 1106 associated with that user. Where the network request involves an interaction with, e.g., an authentication and identity management system, this may be represented as another entity, or as an event 1106 (or group of events 1106) in the event vector 1110 for the user. At the same time, a second event vector 1110 for the compute instance 1102 may also be created and reported along with other temporally adjacent or otherwise related events 1106 associated with that compute instance 1102. Alternatively, the event vectors 1110 may be organized around chronology. That is, groups of events 1106 within a window of time may be reported as an event vector 1101. The event vectors 1110 may also or instead be organized around other aspects of the system 1100, such as particular sensors 1104 or groups of sensors 1104, causal relationships among events 1106, particular triggers, types of activity (e.g., network communications, operating system, processes, etc.) and so forth. In general, the source of each event 1106, such as a particular sensor 1104, or some entity, computing object or the like associated with the sensor 1104, may be encoded with the event 1106 to permit explicit identification by the threat management facility 1112 or other downstream processing resources. Although depicted in FIG. 11 as having similar size, it will also be understood that the event vectors 1110 may be any size, and may usefully encode any number of different events 1106.

The event vectors 1110 may be received by the threat management facility 1112 and stored as an event stream 1114 in a data repository 1116, which may be any data store, memory, file or the like suitable for storing the event vectors 1110. The event vectors 1110 may be time stamped or otherwise labeled by the threat management facility 1112 to record chronology. In general, the event stream 1114 may be used for analysis and detection as further described herein.

In general, an analysis module 1118 may analyze the event stream 1114 to identify patterns of events 1106 within the event stream 1114 useful for identifying unusual or suspicious behavior. In one aspect, this may include creating entity models 1120 that characterize behavior of entities, such as any of the entities described herein. Each entity model 1120 may, for example, include a multi-dimensional description of events 1106 for an entity based on events 1106 occurring over time for that entity. This may be, e.g., a statistical model based on a history of events 1106 for the entity over time, e.g., using a window or rolling average of events 1106.

The entity models 1120 may, for example, be vector representations or the like of different events 1106 expected for or associated with an entity, and may also include information about the frequency, magnitude, or pattern of occurrence for each such event 1106. In one aspect, the entity model 1120 may be based on an entity type (e.g., a particular type of laptop, or a particular application), which may have a related event schema that defines the types of events 1106 that are associated with that entity type. This may usefully provide a structural model for organizing events 1106 and characterizing an entity before any event vectors 1110 are collected, and/or for informing what events 1106 to monitor for or associate with a particular entity.

As an event stream 1114 is collected, a statistical model or the like may be developed for each event 1106 represented within the entity model so that a baseline of expected activity can be created. In one aspect, an existing model may be used, e.g., when the entity or entity type is already known and well characterized. The entity model may also or instead be created by observing activity by the entity (as recorded in the event stream 1114) over time. This may include, for example, monitoring the entity for an hour, for a day, for a week, or over any other time interval suitable for creating a model with a sufficient likelihood of representing ordinary behavior to be useful as a baseline as contemplated herein. In one practical example, certain software applications have been demonstrated to yield a useful baseline within about two weeks. It will also be understood that, once an entity model is created, the entity model may usefully be updated, which may occur at any suitable intervals according to, e.g., the length of time to obtain a stable baseline, the amount of activity by the entity, the importance of the entity (e.g., to security, operation of a compute instance 1102, and so forth), or any other factors.

These techniques may be used to create an entity model 1120 for any of the entities described herein, including without limitation physical hardware items, virtualized items, software items, data and date stores, programming interfaces, communications interfaces, remote resources, and so forth, or any of the other entities, computing objects, assets or the like described herein. In one aspect, the entities may be arranged around a conceptual stack for an endpoint in an enterprise network, such as by providing entities for a domain controller, a compute instance, a user, an operating system, a library, an application, a process, and data. This may also or instead include any of a number of physical devices such as a laptop, a desktop, a gateway, a router, a firewall, a smartphone, a tablet, a personal computer, a notebook, a server, a mobile device, an IoT device. The entity may also or instead include hardware subsystems such as a peripheral, a keyboard, a mouse, a display, a network interface card, a USB drive, a camera, a disk drive or other physical storage device, and so forth. The entity may also or instead include a virtualized instance of any of these physical devices or systems, or any other virtualized compute instance or other computing resource such as a virtual machine, a hypervisor, or the like. In another aspect, this may include computing objects or resources such as a container, an operating system, a library, an application, a process, a file or other data, or the like. An entity may also or instead include remote resources, such as a cloud computing resource, cloud data resource, remote software service, or any other network resource or the like. An entity may also include other entities such as a user or related identity, or more specific system resources such as a kernel driver, system registry, process cache, and so forth. More generally, any physical, virtual, logical, or other computing resource, asset, or the like that can usefully be instrumented and/or monitored to provide events for use as contemplated herein may be an entity as that term is used in this description.

As noted above, the entities of interest here may exist non-exclusively at various levels of hardware and software abstraction, and the entity models may similarly be of varying and overlapping scope. By way of a non-limiting example, an entity model for a laptop may include applications running on the laptop. In one aspect, the entity model may incorporate all network activity by the laptop, while in another aspect, network activity may be associated with the entity models for specific applications. Or the network activity may be associated with both entities, e.g., such that a single event is incorporated into multiple event vectors associated with multiple entities. In general, these design choices may affect the granularity of detections, the amount of processing and communications overhead, and so forth, and any such variations consistent with deployment within an enterprise network as contemplated herein are intended to fall within the scope of this disclosure.

According to the foregoing, in one aspect an entity model may contain a schema or the like describing events associated with an entity (or a type of entity), along with information about normal or expected behavior for each event 1106 associated with the entity. In one aspect, an entity type (e.g., laptop, or laptop by manufacturer X, or virtual machine in environment Y) may be used to select a schema for an entity model, while activities of a particular instances of that entity type may be used to generate the baseline for the entity model used in detections and the like. Thus, for example, if a user installs an office productivity suite, an entity model for that entity type may be selected based on the types of events 1106 known to be associated with the use the application, or the capabilities of the application. However, different users may use the software differently, so the baseline of expected behavior may be evaluated for a particular installation of the application by monitoring activity of the application over time. In another aspect, the schema for an entity model may itself be extensible. That is, the schema of different events 1106 may be created based on observations of activity associated with the entity. When a new type of event 1106 is detected for that entity, the event 1106 may be added to the schema for a corresponding entity type.

Once an entity model 1120 has been created and a stable baseline established, the entity model 1120 may be deployed for use in monitoring prospective activity. This monitoring may, for example, use the same event stream 1114 that was used to create the entity model 1120, or a filtered or otherwise processed version of the event stream 1114. It will be appreciated that the entity models 1120 may generally be deployed as fixed or relatively static or discrete models, or any one or more of the entity models 1120 may be continuously updated so that they change over time as new information becomes available, e.g., in the event stream 1114 or otherwise.

The detection engine 1122 may compare new events 1106 generated by an entity, as recorded in the event stream 1114, to the entity model 1120 that characterizes a baseline of expected activity. By representing the entity model 1120 and the event vectors 1110 in a common, or related, vector space, deviations from expected behavior can usefully be identified based on the vector distance between one or more event vectors 1110 and the entity model 1120. This comparison may usefully employ a variety of vector or similarity measures known in the art. For example, the comparison may use one or more vector distances such as a Euclidean distance, a Mahalanobis distance, a Minkowski distance, or any other suitable measurement of difference within the corresponding vector space. In another aspect, a k-nearest neighbor classifier may be used to calculate a distance between a point of interest and a training data set, or more generally to determine whether an event vector 1110 should be classified as within the baseline activity characterized by the entity model.

It will be understood that, while event vectors 1110 and entity models 1120 as described herein provide one useful technique observing deviations from a baseline of expected behavior by entities within an enterprise, the detection engine 1122 may also or instead employ other detection techniques based on the event stream 1114, e.g., to support real time detection of suspicious or malicious behavior. For example, certain events 1106 may be independently and directly indicative of malicious activity, such as initiating communications with a known command and control center for an advanced persistent threat. Other events 1106 may be potentially indicative of malicious activity, such as initiating disk-wide encryption or transmitting sensitive information from an endpoint. While tools exist for detecting these types of malicious activity, relevant events 1106 may be present in the event stream 1114, and the response facility 1124 may usefully trigger additional analysis, investigation, or other responses based on the event stream 1114 instead of or in addition to monitoring for deviations from entity baselines. In another aspect, concurrent deviations by different entities, or a pattern of deviations for a single entity or among entities, may also be usefully monitored. For example, a deviation in the behavior of a trusted application across multiple compute instances 1102, either concurrently or in succession, may indicate a rollout of a software update rather than malicious behavior. Conversely, if a number of compute instances 1102 concurrently begin contacting an unknown network address, this may be an indication of malware propagating among devices in an enterprise network. More generally, deviations among different entities, or among multiple instances of a particular entity, may provide useful information about actual or potential causes of the change, and may inform subsequent manual or automated investigations.

In general, where the event stream 1114 deviates from a baseline of expected activity that is described in the entity models 1120 for one or more entities, any number of responses may be initiated by the response facility 1124 of the threat management facility 1112. In one aspect, this may include deployment of known remediations for malicious activity such as quarantine, termination of network communications, termination of processes or applications, an increase in local monitoring activity on affected compute instances 1102, messages to a network administrator, filtering of network activity, antivirus scans, deployment of security patches or fixes, and so forth. This may also in policy updates. For example, security policies for compute instances 1102, users, applications or the like may be updated to security settings that impose stricter controls or limits on activity including, e.g., limits on network activity (bandwidth, data quotas, permitted network addresses, etc.), limits on system changes (e.g., registry entries, certain system calls, etc.), limits on file activity (e.g., changes to file permissions), increased levels of local activity monitoring, and so forth.

Figure 12:
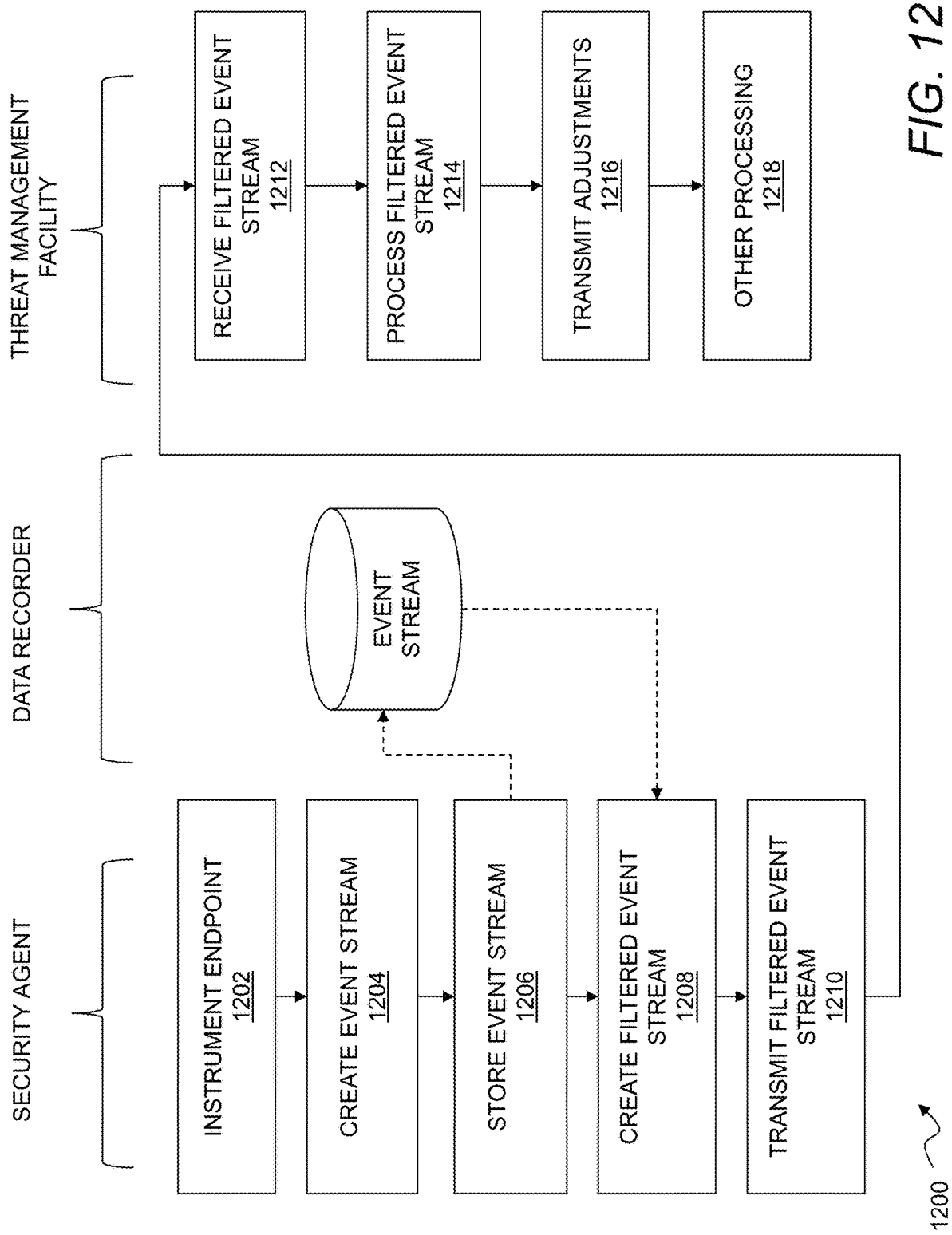
FIG. 12 shows a flow chart of a method for dynamic filtering of endpoint event streams.

FIG. 12 shows a flow chart of a method for dynamic filtering of endpoint event streams. In general, activity on an endpoint is monitored in two stages with a local agent. In a first stage, particular computing objects on the endpoint are selected for tracking. In a second stage, particular types of changes to those objects are selected. By selecting objects and object changes in this manner, a compact data stream of information highly relevant to threat detection can be provided from an endpoint to a central threat management facility. In order to support dynamic threat response, the locus and level of detection applied by the local agent can be controlled by the threat management facility.

As shown in step 1202, the method 1200 may include instrumenting the endpoint, e.g. with a local agent, to detect a plurality of types of changes to a plurality of computing objects. In general, the changes may be any of the events or other actions described herein, and the computing objects may be any of the computing objects described herein. For example, the computing objects may include a number of files, a number of processes, and/or a number of executables. The computing objects may also or instead include one or more of an electronic communication, a registry of system settings, a secure kernel cache, or any other data or data structure stored on an endpoint or communicated to or from the endpoint. Similarly, the types of changes may be any types of changes that might usefully be monitored in a threat management context as contemplated herein. For example, the endpoint may be instrumented to detect file reads and writes, but not file opens or closes. Or the endpoint may be instrumented to monitor inbound and outbound electronic mail, but not outbound electronic mail to other users within the enterprise. As another example, the endpoint may be instrumented to monitor changes to operating system registry entries by non-system processes, or to monitor read/write activity that substantially increases file entropy. More generally, any types of changes that might contribute to a determination of suspiciousness or safety can usefully be monitored, with instrumentation of suitable, corresponding computing objects, all as contemplated herein.

As shown in step 1204, the method 1200 may include creating an event stream from the local agent including each type of change to each of the computing objects detected on the endpoint.

As shown in step 1206, the method 1200 may include storing the event stream in a data recorder on the endpoint. This may generally be an unfiltered event stream containing additional event data not including in a filtered event stream that is sent to a threat management facility, and may include some or all of the event data that the endpoint is instrumented to detect. For example, the unfiltered event stream may include additional ones of the plurality of types of changes to the plurality of computing objects in a filtered event stream, or changes to additional ones of the plurality of computing objects not included in the filtered event stream.

As shown in step 1208, the method 1200 may include processing the event stream with a filter at the endpoint to provide a filtered event stream including a subset of the types of changes to a subset of the computing objects. In one aspect, the subset of computing objects includes one or more of a file, an executable, a process, a database, and a message. In another aspect, the types of changes include at least one of a file read, a file write, a file copy, a file encrypt, a file decrypt, a network communication, a registry update, a software installation, a change in permissions, and a query to a remote resource. It will be understood that, while the filtered event stream is illustrated as flowing from the event stream stored by the data recorder, the filtered event stream may also or instead be created directly by a security agent as the unfiltered event stream is captured and forwarded to the data recorder for storage.

Processing the event stream with the filter may also include locally adjusting the filter at the endpoint, e.g., in response to local changes detected on or by the endpoint. For example, the level of filtering may be locally adjusted by the endpoint based on a reputation score for one or more processes, files, or the like on the endpoint. This filtering may be done for all detectable events on the endpoint, or for specific processes. Thus, for example, when a reputation for a new process or other computing object is unknown, the endpoint may decrease filtering to provide greater data reporting to the threat management facility for that particular process. Thus, while step 1216 below contemplates controlling the filter from a central threat management facility or the like, the filter may also or instead be controlled locally on an endpoint in response to changes in security posture, policy compliance posture, or any other events, context, malware detections, and so forth.

In one aspect, the filtered event stream may be arranged around anchor points such as a file, a domain name, or any other useful piece of data or metadata for which the presence can be monitored on an endpoint. For example, a file hash may be created for a file and used to test for the presence of that file on endpoints throughout an enterprise. Whenever this anchor point, e.g., the corresponding file hash, is detected on an endpoint, a collection of related events, metadata, context and so forth may be added to the filtered event stream for reporting to a central threat management facility.

In another aspect, the level of filtering may be locally controlled based on factors or requirements other than threat detection. For example, an event stream may be filtered to remove personal identifying information, e.g., for compliance with data privacy regulations. As another example, filtering may be controlled based on network usage restrictions, e.g., so that a particular endpoint does not exceed a predetermined hourly, daily, or weekly quota of bandwidth for event reporting.

Further, it will be understood that the filtered event stream may include synthetic events that characterize other collections of events in a single event or condensed group of events. This approach advantageously permits more compact communication of relevant information to a threat management facility, as well as more compact storage of information on the endpoint. In one aspect, the synthetic events may be stored by the data recorder in place of (e.g., to reduce memory requirements) or in addition to (e.g., to reduce communications requirements while preserving a more complete log or related activity) more detailed logging of granular events on the endpoint. In another aspect, the data recorder may store complete event details, and the endpoint may (e.g., with the security agent) create synthetic events dynamically to facilitate more compact communication to the threat management facility.

As shown in step 1210, the method 1200 may include transmitting the filtered event stream to a threat management facility. The filtered event stream may be transmitted at any suitable frequency including periodic, aperiodic, or other scheduled transmittal, as well as pushed transmittal (e.g., at intervals determined by the endpoint) or pulled transmittal (e.g., at intervals determined by the threat management facility, or any combination of these. Thus, for example, the endpoint (or security agent on the endpoint) may periodically report the filtered event stream on a predetermined schedule, with supplemental transmittals provided when the security agent detects a potential threat, or requested when the threat management facility detects a potential threat.

As shown in step 1212, the method 1200 may include receiving the filtered event stream at the threat management facility.

As shown in step 1214, the method 1200 may include processing the filtered event stream at the threat management facility to evaluate a security state of the endpoint. This may include any processing suitable for analyzing the events within the filtered event stream. For example, processing the filtered event stream may include searching for potential malicious activity on the endpoint, e.g., based on a pattern of activities within the filtered event stream, or based on a specific activity such as an unauthorized change to a registry entry. Processing the filtered event stream may also or instead include searching for a security exposure on the endpoint such as a missing security patch, a change in a firewall configuration, a de-installation of a malware scanner, and so forth. In another aspect, processing the filtered event stream may include securely verifying a status of the endpoint, e.g., with a secure heartbeat or the like from the endpoint, in order to ensure that the endpoint has not been otherwise compromised. In another aspect, processing the filtered event stream may include monitoring for changes that bring the endpoint out of compliance with a security policy for an enterprise, or otherwise present an actual or potential risk to network security for the enterprise.

As shown in step 1216, the method 1200 may include conditionally transmitting adjustments to filtering by the endpoint. For example, the method 1200 may include, in response to a predetermined security state detected by the threat management facility, transmitting an adjustment to the endpoint for at least one of the types of changes or the computing objects used by the filter to process the event stream. This may include transmitting an adjustment to a filter used by the endpoint to select which of the plurality of types of changes to the plurality of computing objects the data recorder reports in the filtered event stream. Thus, for example, when the security state indicated by the filtered event stream is a potentially compromised state of a file, process or the like, the threat management facility may decrease filtering in order to receive more data about various changes to or by computing objects on the endpoint. This may include general changes to the level of filtering, or targeted changes that focus on specific computing objects or types of changes that might be related to a potential compromise. In one aspect, the adjustment to endpoint filtering may include a change to the subset of types of changes included in the filtered event stream, such as by increasing the types of changes included in the filtered event stream when the endpoint is potentially compromised, or decreasing the types of changes included in the filtered event stream when a potential compromise has been remediated. The adjustment may also or instead include a change to the subset of computing objects included in the event stream, such as by monitoring additional processes, directories or the like when a potential compromise is detected.

Adjustments may also be made to filtering by other endpoints within an enterprise network. For example, where a compromise is detected on one endpoint, behaviors or other patterns detected in the (filtered) event stream for that endpoint may be used to adjust the filtering on other endpoints to facilitate the detection of similar or related patterns elsewhere within the enterprise network. Similarly, endpoints or data resources known to contain high business value assets may have filtering adjusted to facilitate more detailed and frequent monitoring of related assets.

In another aspect, filtering may be adjusted independently of the current filtered event stream, e.g., based on other context. For example, when an employee is about to leave a company, filtering may be reduced on or removed from any associated compute instances so that computing or network activity can be more closely monitored until departure.

As shown in step 1218, the method 1200 may include other processing based on the filtered event stream. For example, the method 1200 may include correlating the filtered event stream to a malware event on the endpoint and searching for the malware event on one or more other endpoints coupled to the enterprise network based on a pattern of events in the filtered event stream. In another aspect, the method 1200 may include storing the filtered event stream at the threat management facility. In another aspect, the method 1200 may include, when the filtered event stream shows that the security state of the endpoint is compromised, initiating a remedial action, e.g., using any of the remediation tools available to the threat management facility.

According to the foregoing, there is also disclosed herein a system including an endpoint and a threat management facility. The endpoint may execute a data recorder to store an event stream including a plurality of types of changes to a plurality of computing objects detected on the endpoint, and the endpoint may execute a local agent to process the event stream with a filter into a filtered event stream including a subset of the plurality of types of changes to a subset of the plurality of computing objects. The local agent may be further configured to communicate the filtered event stream to a remote resource over a data network. The threat management facility may be configured to receive the filtered event stream from the endpoint and to process the filtered event stream to evaluate a security state of the endpoint. The threat management facility may be further configured to respond to a predetermined change in the security state by transmitting an adjustment to the endpoint for at least one of the types of changes or the computing objects used by the filter to process the event stream. In one aspect, the threat management facility may be configured to initiate a remediation of the endpoint when the security state of the endpoint is compromised.

Figure 13:
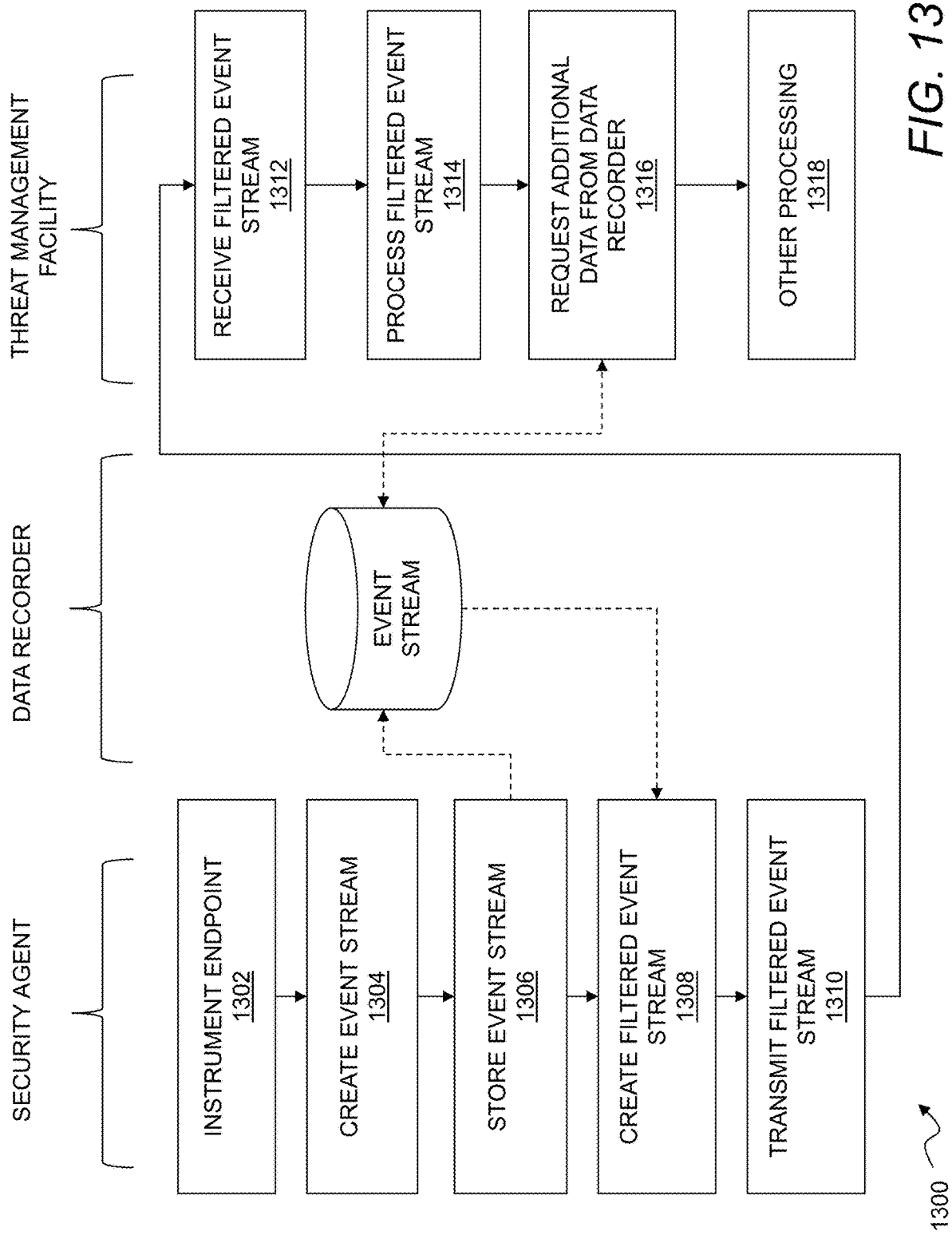
FIG. 13 shows a flow chart of a method for forensic query of local event streams in an enterprise network.

FIG. 13 shows a flow chart of a method for forensic query of local event streams in an enterprise network. In general, activity on an endpoint is monitored in two stages with a local agent. In a first stage, particular computing objects on the endpoint are selected for tracking. In a second stage, particular types of changes to those objects are selected. By selecting objects and object changes in this manner, a compact data stream of information highly relevant to threat detection can be provided from an endpoint to a central threat management facility. At the same time, a local data recorder creates a local record of a wider range of objects and changes. The system may support forensic activity by facilitating queries to the local data recorder on the endpoint to retrieve more complete records of local activity when the compact data stream does not adequately characterize a particular context.

As shown in step 1302, the method 1300 may include instrumenting the endpoint as described herein, e.g. with a local agent, to detect a plurality of types of changes to a plurality of computing objects. In general, the changes may be any of the events or other actions described herein, and the computing objects may be any of the computing objects described herein. For example, the computing objects may include a number of files, a number of processes, and/or a number of executables. The computing objects may also or instead include one or more of an electronic communication, a registry of system settings, and a secure kernel cache.

As shown in step 1304, the method 1300 may include creating an event stream from the local agent including, for example, each type of change to each of the computing objects detected on the endpoint.

As shown in step 1306, the method 1300 may include storing the event stream in a data recorder on the endpoint. As described above, this may generally be an unfiltered event stream containing additional event data not including in a filtered event stream that is sent to a threat management facility, such as some or all of the event data that the endpoint is instrumented to detect. For example, the unfiltered event stream may include additional ones of the plurality of types of changes to the plurality of computing objects in a filtered event stream, or one or more of the plurality of types of changes to additional ones of the plurality of computing objects.

As shown in step 1308, the method 1300 may include processing the event stream with a filter at the endpoint to provide a filtered event stream including a subset of the types of changes to a subset of the computing objects. In one aspect, the subset of computing objects includes one or more of a file, an executable, a process, a database, and a message. In another aspect, the types of changes include at least one of a file read, a file write, a file copy, a file encrypt, a file decrypt, a network communication, a registry update, a software installation, a change in permissions, and a query to a remote resource.

As shown in step 1310, the method 1300 may include transmitting the filtered event stream to a threat management facility, e.g., as described above.

As shown in step 1312, the method 1300 may include receiving the filtered event stream at the threat management facility.

As shown in step 1314, the method 1300 may include processing the filtered event stream at the threat management facility to evaluate a security state of the endpoint. This may include any processing suitable for the events within the filtered event stream. For example, processing the filtered event stream may include searching for potential malicious activity on the endpoint, e.g., based on a pattern of activities within the filtered event stream, or based on a specific activity such as an unauthorized change to a registry entry. Processing the filtered event stream may also or instead include searching for a security exposure on the endpoint such as a missing security patch, a change in a firewall configuration, a de-installation of a malware scanner, and so forth. In another aspect, processing the filtered event stream may include securely verifying a status of the endpoint, e.g., with a secure heartbeat or the like from the endpoint, in order to ensure that the endpoint has not been otherwise compromised. More generally, this may include any of the processing described herein that might usefully be performed by a threat management facility based on an event stream from one or more endpoints associated with an enterprise network.

As shown in step 1316, the method 1300 may include conditionally transmitting a request to the endpoint, or more specifically, the data recorder on the endpoint, for additional event data in the unfiltered event stream. For example, this may include, in response to a predetermined security state detected by the threat management facility, requesting additional event data from the data recorder for at least one of other ones of the types of changes than the subset of the types of changes or other ones of the plurality of computing objects than the subset of the computing objects. The request may include a request for all event data in an unfiltered event stream stored by the data recorder over a predetermined time window. The request may also or instead include a request for a larger group of types of changes or events from additional computing objects. The predetermined change in the security state may be any change raising suspicion or otherwise indicating that additional information may be useful for manual review, automated review, forensic documentation, or some combination of these. For example, the predetermined change in the security state of the endpoint may include an increased likelihood of malicious activity associated with the endpoint. The change may also or instead include a change in policy compliance, detection of known malware, suspicious network communications, access to highly valuable business assets, and so forth.

As shown in step 1318, the method 1300 may include other processing based on the filtered event stream. For example, the method 1300 may include correlating the filtered event stream to a malware event on the endpoint and searching for the malware event on one or more other endpoints coupled to the enterprise network based on a pattern of events in the filtered event stream. In another aspect, the method 1300 may include storing the filtered event stream at the threat management facility. In another aspect, the method 1300 may include, when the filtered event stream shows that the security state of the endpoint is compromised, initiating a remedial action, e.g., using any of the remediation tools available to the threat management facility. More generally, any action necessary or helpful for detecting, investigating, disposing of, or otherwise managing threats based on the filtered event stream may usefully be performed in this step.

According to the foregoing, in one aspect, there is disclosed herein a system including an endpoint and a threat management facility. The endpoint may execute a data recorder to store an event stream of event data including a plurality of types of changes to a plurality of computing objects detected on the endpoint. The endpoint may also execute a local agent configured to process the event stream with a filter into a filtered event stream including a subset of the plurality of types of changes to a subset of the plurality of computing objects. The local agent may be further configured to communicate the filtered event stream to a remote resource over a data network. The threat management facility may be configured to receive the filtered event stream from the endpoint and to process the filtered event stream to evaluate a security state of the endpoint, the threat management facility further configured to respond to a predetermined change in the security state by transmitting a request to the endpoint for additional event data stored by the data recorder. In one aspect, the threat management facility is further configured to initiate a remediation of the endpoint when the security state of the endpoint is compromised.

Figure 14:
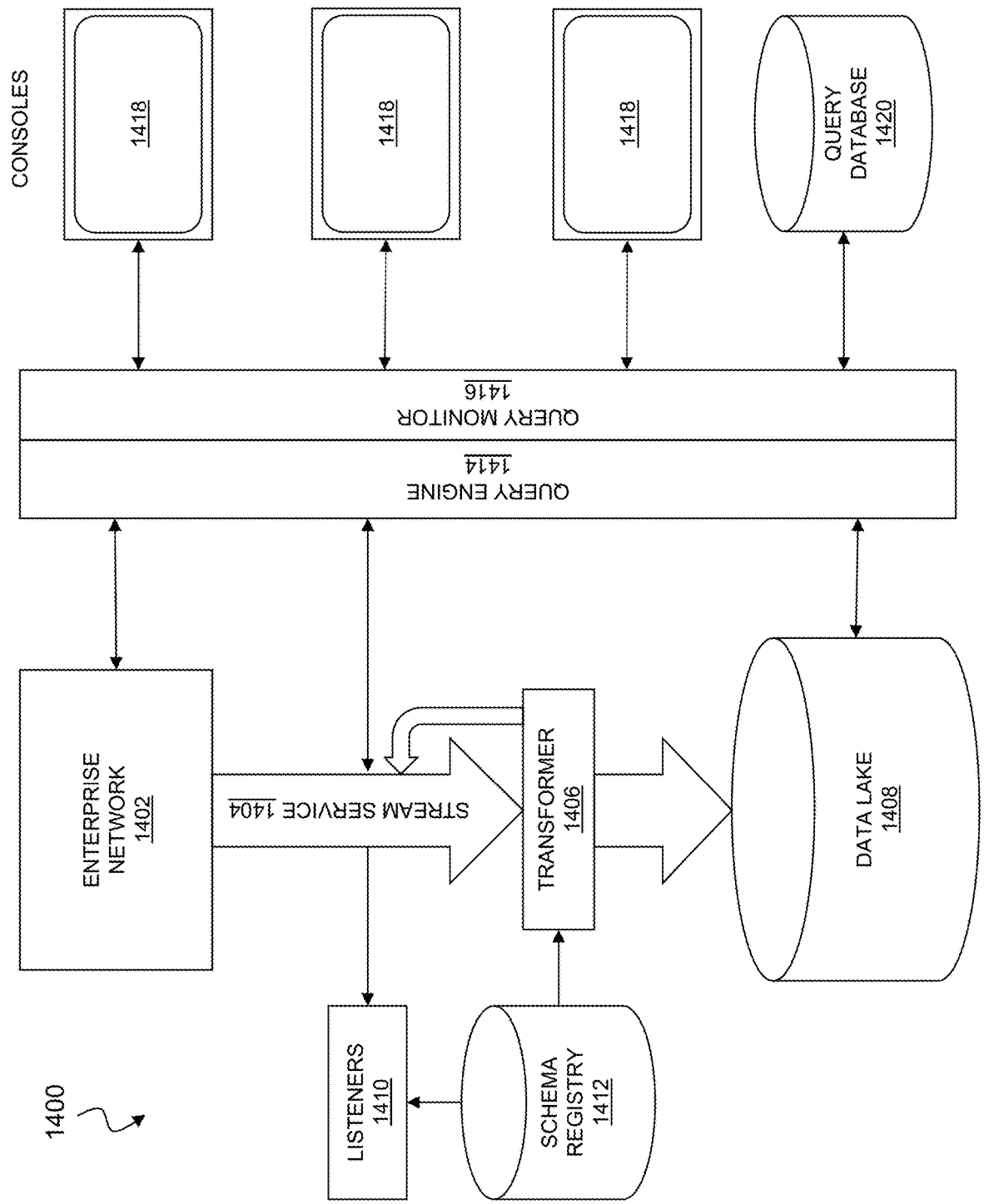
FIG. 14 shows a platform for managing data related to threat management.

FIG. 14 shows a platform for managing data related to threat management. In general, the platform 1400 may include an enterprise network 1402, a stream service 1404, a transformer 1406, a data lake 1408, and a number of listeners 1410. An event stream of events and related data in the stream service 1404 may be organized using schemas that are stored in a schema registry 1412 or similar resource available to various entities interacting with the stream service 1404 and/or data lake 1408. The platform may also include a query engine 1414 for user access to the data lake 1408 and other sources of data in the data platform 1400 (including remote resources accessible to the data platform 1400), along with a query monitor 1416 for monitoring queries and related activity and one or more consoles 1418 that provide user interfaces for the platform 1400 and the query engine 1414. A database 1420 may store queries for use by the query engine 1414, along with query histories and related activity logged by the query monitor 1416. In general, these components may cooperate to support monitoring, data storage, query, retrieval, and analysis of events and other data related to enterprise security, or any other activities useful in managing a security infrastructure as described herein. Each of the foregoing components of the platform 1400 may be realized as software, hardware, or some combination of these.

The enterprise network 1402 may include any of the endpoints described herein such as laptops, desktops, mobile devices, or other compute instances for users, as well as firewalls, gateways, and any other participants, security infrastructure, network infrastructure, or the like forming an enterprise network as described herein. In general, the enterprise network 1402 may produce a stream of events such as any of the events described herein. This may include events from sensors, events from local security agents, events from network elements or points of presence (such as firewalls, gateways, WiFi routers, access points, etc.), and so forth. It will be appreciated that these events may in general be streaming events that are provide to, and ingested by, the stream service 1404 in real time, or batches of events that are provided as collections of events in a single transmission, e.g., based on a local reporting schedule used within the enterprise network 1402 or based on network availability.

The stream service 1404 may ingest events from the enterprise network 1402 including any of the events and the like described herein. In one aspect, the stream service 1404 may receive events through an interface using pre-signed Uniform Resource Locators or other techniques that can automatically append prefixes that identify a customer, a device, or other source information for each event or collection of events. The stream service 1404 may also or instead receive data from any other sources of events relevant to enterprise security or otherwise useful for managing the data platform 1400 as described herein. For example, this may include receiving signature updates for threat detection from third party security resources, receiving software updates and patches from software vendors, and so forth. In general, the stream service 1404 may include any suitable event stream processing storage or technology, or any similar hardware and/or software layer suitable for storing, managing, processing, and querying streams of events as contemplated herein, or otherwise supporting event-driven information. Some or all of the data in the stream service 1404 may also or instead be stored in a high-speed storage facility for queries or other data processing having high-performance requirements.

The transformer 1406 may generally process events in the stream service 1404, e.g., by organizing data according to one or more applicable schemas from the schema registry 1412, and augmenting the data with any suitable metadata to provide augmented event data for use in threat detection, investigation, and management. For example, the transformer 1406 may add a customer identifier, a firewall identifier, or other information for identifying a source of an event. The transformer 1406 may also or instead add a schema version that specifies a schema in the schema registry 1412 that can be used to organize data provided to the stream service 1404 or the data lake 1408. The transformer 1406 may also or instead create a timestamp, file size, hash, file path, or other information useful for identifying or describing data associated with an event, or the source or interpretation thereof, which may be appended to the event(s) before storing in the data lake 1408. In general, the transformer 1406 may transmit transformed event data back to the stream service 1404 for short-term usage (e.g., one hour, one day, seven days, etc.) by the listeners 1410 or high-speed access by the query engine 1414. The transformer 1406 may also or instead transmit transformed event data to the data lake 1408 for long-term storage (e.g., one week, one month, one year, etc.). It will be understood that the general boundaries for short-term and long-term storage may vary according to, e.g., storage capacity, processing speed, data volume, and so forth. When the transformer 1406 sends messages with metadata to the stream service 1404, the transformer 1406 may use any suitable data format, and may usefully compress the stream representation by including pointers to replace, e.g., a schema, the underlying source data, and so forth.

While shown as a single transformer 1406, it will be understood that the platform 1400 may use any number of transformers, operating in sequence or in parallel, or some combination of these, suitable for timely processing events and maintaining the stream service 1404 in a state suitable for, e.g., real time threat detection, remediation, and/or other security-related functions.

The data lake 1408 may receive messages from the transformer 1406, and store the message data in a manner that supports long-term storage and permits search and retrieval by the query engine 1414. In general, the data lake 1408 may provide a single store of data including source data in a natural or originally-provided raw data format, e.g., as binary large objects ("blobs") or other files or the like, along with any metadata or transformed data added thereto. The data lake 1408 may contain structured data (e.g., from relational databases), semi-structured data containing CSV, logs, XML, JSON and so forth, and/or unstructured data such as emails, documents, PDFs, and binary data such as images, audio, video, and any other data that might be received from the enterprise network 1402 or other sources relevant to network security system as described herein. In one aspect, source data in the stream service 1404 may be filtered or otherwise processed by the transformer 1406 in order to improve the quantity and quality of data maintained in the data lake 1408 for the various uses described herein. A variety of cloud-based technologies and other data lake technologies are known in the art and commercially available, and may be adapted for use with the data lake 1408 described herein.

The listeners 1410 may be user-configurable or pre-configured listeners that monitor the stream service using, e.g., metadata provided by the transformer 1406, for events of interest. Each listener 1410 may monitor an event stream supported by the stream service 1404, and generate suitable alerts, actions, or other responses by applying rules, application logic, filters, and so forth to events in the event stream.

The schema registry 1412 may store schemas for use by, e.g., the transformer 1406 and/or the listeners 1410 when writing data to the stream service 1404, reading data from the stream service 1404, or otherwise processing or interacting with data in the stream service 1404 or the data lake 1408. In general, schemas may be versionable or otherwise extensible, and each message in the stream service 1404 using a schema to structure data may include an identifier for the schema in the message to facilitate interpretation and other use by consumers of the stream service 1404. Users of the platform 1400 in general, and the stream service 1404 and data lake 1408 in particular, may inspect current schemas, update schemas (that they own or control), and otherwise access the schema registry 1412 to interact with the stream service 1404 and data lake 1408 in a structured manner, or otherwise support various functions of the platform 1400 described herein. As new schemas are created, e.g., to address new types of data or information, or as current schemas are updated, a history of the schema identifiers and versions may be retained in the schema registry 1412 for subsequent reference, and/or a newest schema may be pushed onto data in the data lake 1408 and/or the stream 1404.

The query engine 1414 may be any search engine suitable for querying the data lake 1408 and other data sources. This may include automated queries run according to a schedule from the query database 1420. This may also or instead include pre-configured queries run from the query database 1420 by a user from one of the consoles 1418. This may also or instead include queries containing customizations of pre-configured queries, or fully custom queries initiated by users from the consoles 1418. It will be understood that, while the data lake 1408 is a useful target for queries by the query engine 1414, the query engine 1414 may also or instead request data from other resources such as the stream service 1404, endpoints or security agents in the enterprise network 1402, or third party data sources such as threat libraries and the like.

The query monitor 1416 may generally monitor query activity by the query engine 1414 as well as other activity by the user consoles 1418. This may include monitoring query activity by users of the consoles 1418, as well as automated or scheduled query activity managed using the query database 1420. In one aspect, the query monitor 1416 may log specific queries initiated by the query engine 1414 in order to track, e.g., popularity of existing queries, user modifications to existing queries, and the like. Thus for example, a query that is frequently modified by users may be republished to the query database 1420 in its modified form for subsequent use as a pre-configured query. In another aspect, the query engine 1414 may monitor a context in which queries are initiated or adapted. For example, a pattern of queries or query modifications may be correlated to a concurrent development of a known threat, and used to create query-based threat detection techniques or to identify query activity that can be associated with effective management of a live threat. As another example, when specific (non-query) measures are initiated from one of the consoles 1418 following a query, including activity such as scans, remedial measures, or the like, this may be used to evaluate an effectiveness of the query and identify queries that appear to be more helpful or informative to users. Thus, by monitoring query activity initiated through the query engine 1414 and/or other contextual activity by users through the consoles 1418, the query monitor 1416 may correlate specific queries to threat identification, threat response, and so forth, or otherwise track the popularity of a query or sequence of queries. All of this information may be stored in the query database 1420 along with query logs, pre-configured queries, and the like for use in monitoring and evaluating query activity as described herein.

The consoles 1418, which may be administrative consoles for system administrators, or any other user consoles or the like, may be deployed from a server or other remote or hosted system using, e.g., web technologies or the like to support a local interface on any suitable end user devices. In general, each console 1418 may display query information, security information, user options, and the like, and may provide user controls for inputting text, selecting options, configuring queries, and so forth. Thus in one aspect, a host device for the platform 1400 may cause one of the consoles 1418 including a user interfaced to be presented on an end user device for an administrator or other end user. Each console 1418 may also include a local agent for tracking activity by console users. While a query monitor 1416 in the data platform 1400 may general track query activity by a local query engine 1414, an agent on each console may advantageously support tracking of other user activity that does not involve direct interactions with the query database 1420 or query engine 1414.

The database 1420 may be any database useful for storing query-related information as described herein. This may, for example, include pre-configured queries for deployment from one of the consoles 1418 through the query engine 1414, as well as a log of queries performed by the query engine 1414 along with metadata such as a time of the query, a user who initiated the query, and the structure of the query. This may also or instead include contextual information such as activity at one of the consoles 1418 before, during, and/or after initiating a query, or any other information that might be useful in evaluating the effectiveness or diagnostic significance of queries initiated through the query engine 1414.

Figure 15:
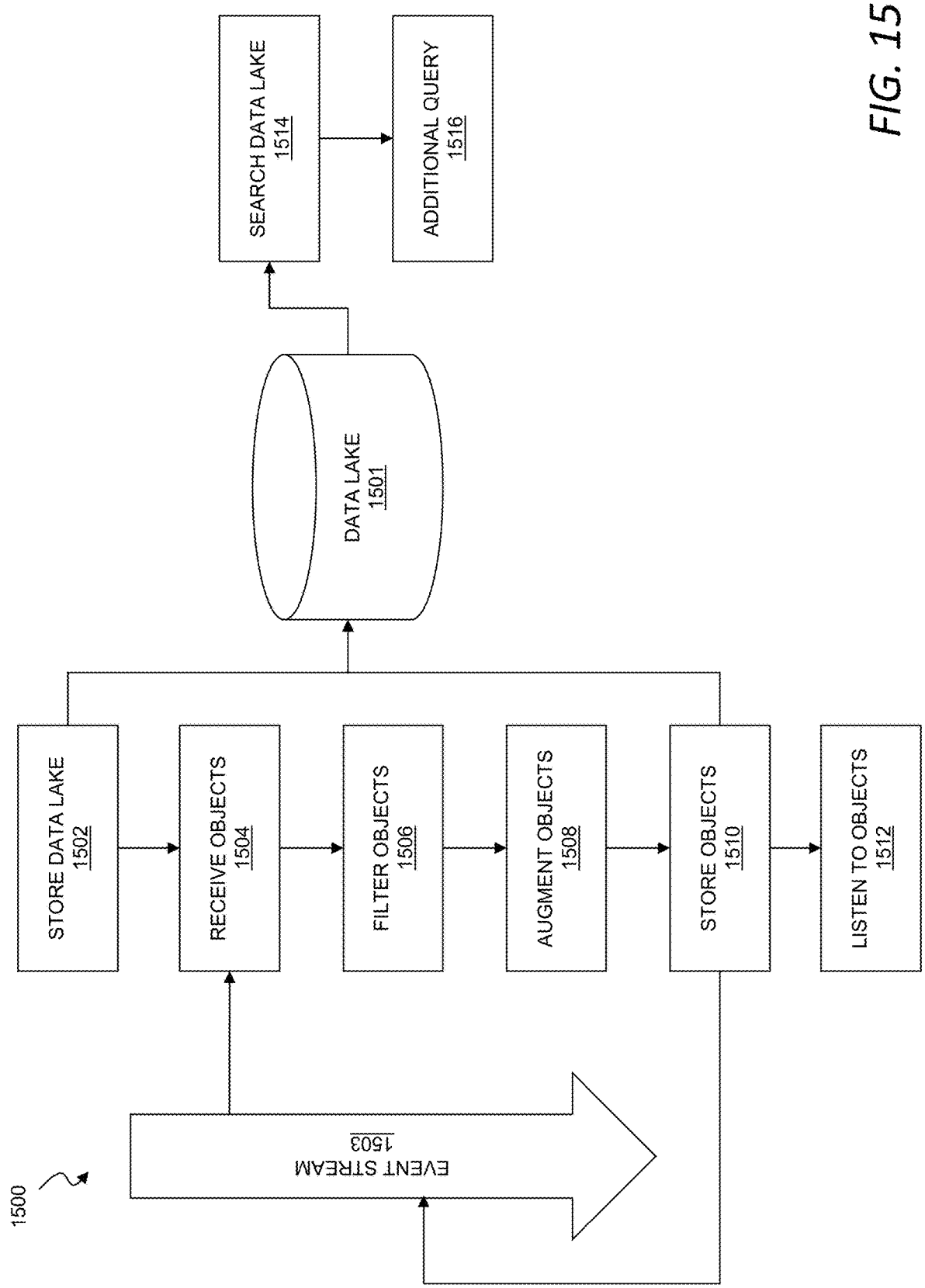
FIG. 15 shows a method for creating a data lake for use in enterprise security.

FIG. 15 shows a method for creating a data lake for use in enterprise security. In general, the data lake may be created for an enterprise from an asynchronous streams of security events by deduplicating objects and creating metadata related to downstream security functions. Deduplication of objects may be efficiently performed with a bloom filter as objects are ingested into the data lake. The objects may also be augmented with metadata arranged in schemas to facilitate monitoring and use within the data lake.

As shown in step 1502, the method 1500 may include storing a data lake 1501, such as any of the data lakes described herein. This may, for example, include storing a data lake containing a first plurality of data objects representing security events and a plurality of descriptions for the first plurality of data objects. The first plurality of data objects may include security events from one or more data recorders on endpoints in an enterprise network, which may be received in an event stream 1503 such as an event stream hosted by the stream service described above, or in any other suitable service or data repository. The plurality of descriptions may be organized according to one or more schemas that characterize the structure of data contained in the data objects. These schemas may, for example, be stored in a schema registry and used to transform or describe the structure of data on the event stream.

In one aspect, the data lake 1501 may use a flat schema employing columnar storage organized by fields such as a user name, time, device, and the like. The data objects in the data lake may also be organized for ease of use, e.g., by placing identifiers or other high level metadata in a small separate file, by placing commonly used data (e.g., extracted or derived data for analytics dashboards, real time event listening, and the like) in a second, small file, and by placing remaining data into a larger data file for access if/when needed.

As shown in step 1504, the method 1500 may include receiving a second plurality of data objects. These data objects may be received in an asynchronous stream of security events from the enterprise network. In one aspect, the asynchronous stream of security events may include one or more batch transfers including groups of security events. In another aspect, the asynchronous stream of security events may include streaming transfers of individual security events. The asynchronous stream may also or instead include a combination of batch transfers and streaming transfers, such as where some devices in the enterprise network stream events in real time, other devices store and forward events and batches, and other devices will send events in a connectivity-dependent manner based on, e.g., the availability, quality, or bandwidth of an available connection. In general the data objects in the data lake may include security events from one or more data recorders on endpoints in the enterprise network, or any other information from any other source or combination of sources useful for security analysis and the like.

As shown in step 1506, the method 1500 may include filtering the received data objects, e.g., using the transformer described above. This may include filtering the second plurality of data objects to remove duplicate data objects already included in the first plurality of data objects. With multiple sensors and endpoints sourcing events in an asynchronous manner, it is possible that a particular event may be reported more than once. In order to avoid contaminating the data lake 1501 with duplicative data, the transformer may usefully remove duplicative information. For example, filtering may include applying at least one bloom filter to identify one of the second plurality of data objects that might be in the data lake and selectively performing a deduplication lookup in the data lake for the one of the second plurality of data objects only where there is a possibility of a duplicate, e.g., where the bloom filter indicates that the data object might already be present in the data lake.

A bloom filter is a space-efficient data structure that uses hashing techniques to test whether an element is a member of a set. In general, a bloom filter eliminates the possibility of false negative matches, but not false positive matches. While other filtering techniques are possible, such as a brute force search of existing records in the data lake 1501, the bloom filter provides a compact and computationally efficient technique that is advantageously extensible with the addition of new elements to a set. Thus a bloom filter may be created and advantageously used with a growing data lake to efficiently test for whether a particular data object has already been stored in the data lake 1501, and to reduce the number of queries to the data lake 1501 that might otherwise be needed for deduplication. This may significantly increase the efficiency of the transformer, particularly where a query to the data lake 1501 is substantially slower than applying the bloom filter. It will also be understood that a separate bloom filter may be created for each device in order to manage size. Thus, when a new device appears in the enterprise network, a new bloom filter may be created and associated with a device identifier or other identifier for the new device so that the new bloom filter can be applied to events associated with the device identifier.

As shown in step 1508, the method 1500 may include augmenting the second plurality of data objects, for example by augmenting each of the second plurality of data objects with a corresponding description that is organized according to at least one of the one or more schemas used by the transformer described above to structure data in an event stream and data lake. For example, an event or message on the event stream 1503 may be processed into a number of different files including, e.g., a first metadata file with high-level metadata that identifies an event such as a source device, an event time, and an objective identifier such as a size, hash, filename, or the like for the object. This first metadata file may use a global schema (e.g., for identification) for all of the data objects placed in the event stream 1503 and/or data lake 1501.

A second metadata file may include tagging or analysis to support real time listening. More generally, the second metadata file may include any identification information or relevant event descriptions, summaries, analysis and the like to support high-speed processing of the event stream 1503. This may include any tagging or characterization useful for automated listeners to identify relevant data or events on the event stream 1503, and may be customized by a particular user according to intended use. For example, the second metadata file may identify an entity type (e.g., firewall, gateway, mobile device, etc.), an event type (e.g., policy violation, configuration change, network event, etc.), a user type (e.g., system, human, etc.), a traffic type, a reputation (including quantitative reputation such as a reputation score, or qualitative reputation information such as "good," "bad," or "unknown"), or any other attribute(s) or information that might be useful to listeners. The schemas for this information may be selected, e.g., for particular users of the data lake 1501, for particular devices providing security events, for particular network locations, and so forth. Thus in one aspect, one of the schemas used to characterize data objects may include a device-dependent schema selected for one of the data objects according to a source of the one of the data objects when received in the asynchronous stream. While device-dependent schemas may usefully be employed to structure metadata differently for different source devices, the schemas may also or instead be specific to a user, a network location, an application, a process, or any other network, physical, or logical source of an event.

In one aspect, the one or more schemas may be columnar schemas to provide a flat, non-hierarchical structure for metadata in order to improve efficiency, e.g., when processing real time event data in the event stream 1503.

As shown in step 1510, the method 1500 may include storing the second plurality of data objects and a corresponding plurality of descriptions according to the one or more schemas with the first plurality of data objects in the data lake. In addition to any metadata files (such as the two described above), this may include a raw data file containing a complete data object as it natively appeared on the event stream 1503 from the enterprise network. After the processing above, the resulting collection of files may be stored in the data lake 1501 in an augmented form including the raw data file along with the first and second metadata files, and/or any other descriptive data or analysis that might be useful to subsequent users. The data objects may be stored in the data lake 1501 in any of a number of forms to optimize storage and use. For example, the data objects may use a flat schema, and may be flagged according to any suitable restrictions on access or use. This may include tagging data as, e.g., sensitive, confidential, financial, technical, valuable, containing personally identifiable information, and so forth. As a transformer or other system processes data for storage, the data objects may also or instead be structured for optimal use on the event stream 1503 and/or in subsequent queries to the data lake 1501.

In another aspect, the metadata files may be stored on the event stream 1503 for real time processing, while the (typically larger) raw data object is sent to the data pool 1501. In this case, the metadata files may include a pointer or other location identifier to assist in retrieval of the raw data from the data pool 1501 when requested, e.g., by one of the listeners. In another aspect, the raw data object may never enter the event stream 1503, and may instead be sent directly to a transformer or similar entity for processing and storage in the data lake 1501. In this manner, the event stream 1503 may be used exclusively for high-speed processing of smaller metadata files, with the raw data objects stored separately in the data lake 1501 for access if/when needed by a listener that detects relevant information in the metadata, or by a user querying the data lake 1501.

As shown in step 1512, the method 1500 may include listening to objects 1512. This may include monitoring the event stream 1503, e.g., by monitoring metadata placed onto the event stream 1503 by a transformer using one or more registered schemas, to identify any relevant attributes, events, actions, or the like in the event stream 1503 that may be relevant to a function of one of the listeners. Where relevant metadata is detected, a corresponding listener may take any suitable action including creating an alert or user notification, initiating remedial action, requesting additional information from endpoints in an enterprise network (e.g., by requesting data stored in local data recorders), by retrieving a corresponding raw data object from the data lake 1501 for analysis, and so forth. In general, this listening may occur as new items are placed on the event stream 1503 (e.g., in real time), or as raw data objects and/or metadata files are stored in the data lake 1501, or any combination of these.

As shown in step 1514, the method 1500 may include searching the data lake 1501 for security events of interest. This may include searching metadata in metadata files that augment raw data objects, searching directly in raw data objects, or some combination of these. It will be understood that security events of interest may include any events from the enterprise network that might be indicative of malicious activity, vulnerabilities, policy compliance, or otherwise relevant to threat detection and security management as described herein.

As shown in step 1516, the method 1500 may include performing any additional queries. For example, where a confidential file is electronically mailed from an endpoint, this may be a permissible communication when performed by a human user with suitable credentials, but an impermissible communication when no human user is present on the endpoint. Where a local security agent monitors for human presence, corresponding information may be stored in a local data recorder but not automatically sent to the event stream. In this case, in response to data obtained during the data lake search, the method 1500 may include directly querying at least one of the endpoints for additional information. It will be understood that this example is intended to be non-limiting, and any event or combination of events suggesting further inquiry may be used as a trigger for requesting additional information from one or more endpoints or data recorders in the enterprise network as contemplated herein.

Thus more generally, while searching the data lake 1501 for security events of interest, an event may be identified that requires additional information from an endpoint, and the method 1500 may include a variety of searches or other tools to support subsequent manual (e.g., human) or automated (e.g., machine) investigation. These additional queries may be performed for any number reasons, for example as the investigation of a developing threat continuous, as the historical analysis of a prior security breach is performed, or as suspicious activity emerges within the enterprise network. Any of this may cause an analyst to create new searches, change the parameters for existing searches, drill down on particular search results, and so forth, and all such types of investigation may usefully be supported by the data lake 1501, including any augmented metadata contained therein.

According to the foregoing, there is described herein a system including a data lake, a stream service and a transformer service. The data lake may include a data storage medium storing a first plurality of data objects representing security events within an enterprise network and a plurality of descriptions for the first plurality of data objects, each of the plurality of descriptions organized according to one or more schemas. The stream service may be configured to receive an asynchronous event stream of additional data objects representing security events from the enterprise network. The transformer service may be configured to process the asynchronous event stream by filtering the additional data objects to remove duplicates of one or more data objects already stored in the data lake, thereby providing filtered data objects, to augment each of the filtered data objects with a corresponding description organized according to one of the one or more schemas, thereby providing augmented data objects, and to store the augmented data objects in the data lake.

The asynchronous event stream may include at least one of a batch transfer including a group of security events, a streaming transfer of one or more individual security events, and a connectivity-dependent transfer. Filtering the additional data objects may include applying a bloom filter to the asynchronous event stream to detect a first group of the additional data objects that are definitely not in the data lake and a second group of the additional data objects that might be in the data lake. The transformer service may be further configured to perform a deduplication lookup in the data lake on each of the second group of the additional data objects. In one aspect, the system may further include a query engine configured to search the data lake for one or more security events of interest, and/or to request data from local data records operating on endpoints within the enterprise network.

FIG. 16 shows a method for discovery of enterprise threats based on security query activity. In general, a threat management system as described herein may provide a collection of queries for investigating security issues within an enterprise. Useful inferences can be drawn about the value of different queries, and about the security posture of the enterprise, by monitoring contextual activity such as the popularity and context of query usage, patterns of end user modification to queries, and post-query activity.

As shown in step 1602, the method 1600 may include receiving an event stream including security events from an enterprise network such as security events from one or more sensors on compute instances in the enterprise network. The event stream may be received, e.g., at a stream service or other suitable resource. This may include any events described herein, such as events captured by sensors on endpoints throughout the enterprise network.

As shown in step 1604, the method 1600 may include storing the event stream in a data lake. This may include any of the data lakes described herein, which may be augmented with metadata files for efficient search and analysis. It will be understood that events may also or instead be locally stored in data records of endpoints, or in any other intermediate location(s). While the data lake may provide a useful medium for storage and search of relevant information. The use of local data recorders advantageously permits offloading of more granular storage, or unprocessed event information, at local devices throughout the enterprise network that may be queried as helpful and/or necessary while investigating enterprise threats.

As shown in step 1606, the method 1600 may include storing a plurality of queries for execution against the event stream and/or data lake. In general, the plurality of queries may be configured to investigate security issues within the enterprise network based on the event stream and/or other information available to a query engine and relevant to investigation of security issues. This may, for example, include database queries or the like configured for use with the data lake.

As shown in step 1608, the method 1600 may include monitoring usage of the plurality of queries, e.g., with a monitoring agent or other automated monitoring system. Thus may include monitoring usage of the plurality queries as they are issued by users from one or more administrative consoles to a threat management facility for the enterprise network. This may also or instead include monitoring automated queries that are issued, e.g., on a scheduled basis from the query database.

In one aspect, this may include monitoring changes to one or more of the plurality of queries. In another aspect, this may include monitoring post-query remediation activity initiated at one or more administrative consoles. For example, where a particular type of remediation is consistently initiated by a user after receiving the results of a particular pre-configured query, then the query may, itself, be used as an indicator of a corresponding threat, which permits improved contextual recommendations to a user initiating the query, and/or a variety of preemptive and/or automated responses based on an inference that the threat is present in the enterprise network. In another aspect, this may include monitoring queries for a plurality of enterprise networks, e.g., so that activity for a number of enterprises may be aggregated and analyzed to identify best practices (and poor practices), and the manner in which query activity by administrators maps to developing threats and/or the success of threat responses. Thus query activity may be effectively crowd-sourced to permit individual enterprise administrators to benefit from successes and mistakes identified in activity by other administrators for other networks.

In one aspect, this may include monitoring usage of the plurality of queries by one or more experts, such as a professional security analyst or technician, in order to develop an expert system or the like for use in generating recommendations or guidance for others when managing networks. This system may make contextual recommendations, respond to inquiries and request for help, and so forth.

As shown in step 1610, the method 1600 may include determining a usage history based on the usage of the plurality of queries. In one aspect, this may include usage of the queries themselves, such as when and how often queries are used, or whether and how they are modified when deployed by users from the administrative consoles. For example, the usage history may include a popularity of one or more of the plurality of queries. This may aid in identifying which queries are perceived as useful so that these queries can be preferentially suggested to users, optimized for higher performance, or otherwise adapted for more widespread and frequent usage.

In another aspect, the usage history may include a pattern of changes to one or more of the plurality of queries. A variety of useful inferences are available based on patterns of change. For example, a change, modification, or customization that is consistently requested for a particular stored query might suggest that the stored query is not optimal for many users. In this case, the stored query may be updated to reflect this user preference. In another example, different types of changes to a popular query may correspond to different threats or other security issues. In this case, a particular modification to a query to focus on, e.g., events in a particular time window, on particular device types (mobile devices, USB drives, etc., devices with a particular operating system, etc.), at particular locations (e.g., path names, network locations, etc.), and so forth may be used to draw useful inferences about a threat or threat resolution in progress.

In another aspect, a pattern of post-query activities initiated from an administrative console (or other user interface or the like) may provide a usage history useful for security analysis. For example, where a particular query is consistently followed by a particular security response such as remediation, malware scanning, network isolation, and the like, then the query may be used as an indicator of a corresponding threat. Similarly, a consistent pattern of post-query activity may suggest that a particular query is valuable or useful, and the query may be ranked more highly in lists of queries presented to a user, or suggested more often in response to user inquiries. Other types of inferences may also be usefully drawn, such as the addition of a new user, a structural re-organization of an enterprise, a change in network security policy, and so forth. By enabling a query monitor or similar tool to monitor activity at administrative consoles beyond data lake search activity, or by providing a local monitoring agent for each administrative console, additional context can be made available to assist in recognizing patterns associated with malware threats, threat remediation and so forth beyond what might be discovered based exclusively on events reported by sensors within the enterprise network. As a significant advantage, this type of monitoring indirectly captures human levels of interest and response that might not otherwise be available when applying rules to streams of events from the enterprise network. A context in which queries are executed may also or instead usefully be employed as a part of the usage history, and may include information about a user of the administrative console, additional global threat or security information from sources other than the enterprise network, business value and reputation associated with security events, heartbeats from endpoints that are providing reports, reputation associated with endpoints or endpoint users, and so forth.

Other context may also or instead be used, such as whether an existing workflow, process, connectivity or the like has been interrupted immediately prior to a new query. For example, where an administrative console diverts attention to a particular endpoint or sequence of events, this may provide useful context concerning the locus of a developing threat. Similarly, threat mitigation activity may provide useful context for the value of a particular query and the circumstances under which the query might be used. Relevant threat mitigation activity may, for example, include machine isolation, forensic analysis, creation of malware traps, and so forth, as well as additional queries that might be used to evaluate how a particular machine became infected or the like.

As shown in step 1612, the method 1600 may include initiating an action by the threat management facility based on the usage history. This may include any of a variety of automated remedial actions or the like, as well as alerts or notifications to administrators or other users that may be affected by a security breach. For example, initiating the action may include identifying a pattern of queries associated with a known threat and generating a recommendation for one or more responsive remedial actions. Initiating the action may also or instead include evaluating a usefulness of one of the plurality of queries based on a pattern of post-query activity. In another aspect, initiating the action may include evaluating a usefulness of one of the plurality of queries based on a pattern of query modifications by users.

More generally, any useful action may be initiated by the system based on aggregated search behavior, context for search behavior, user actions before, during, and after searches, or inferences available from combinations of the foregoing. For example, if a particular query is highly popular, then data for this query may be regularly prefetched for improved response times. Similarly, where one particular query is very frequently followed by another particular query, data for the second query may be prefetched when the first query is initiated. As another example, when a particular query is regularly followed by requests for additional information from local data recorders on endpoints within the enterprise network, the query monitor or some other suitable automated software agent may initiate requests for corresponding data from security agents on the endpoints in order to begin aggregating the anticipated data for use. This may be particularly advantageous in contexts where there is some significant expected latency in responses from the individual security agents throughout the enterprise network.

In another aspect, a general record of events surrounding a threat including, e.g., any of the context described above along with a pattern of queries, query modifications, requests for additional data (e.g., from data recorders), and other query activity or user actions and the like, may usefully characterize a particular threat in a manner that permits subsequent identification of similar threats. For example, this data may be converted into training sets for machine learning, and a model may be trained to detect future threats, or to provide guidance in responding to threats, based on these observations.

According to the foregoing, there is described herein a system including a data lake, an administrative console, a database, and a query monitoring agent. The data lake may store an event stream including security events from one or more sensors on compute instances in an enterprise network. The administrative console may receive queries from users and cause the queries to be executed against the event stream. The database may store a plurality of queries for execution against the event stream at the administrative console, the plurality of queries configured to investigate security issues within the enterprise network based on the event stream. The query monitoring agent may provide a query monitor configured to monitor a usage of the plurality of queries at the administrative console, to determine a usage history based on the usage of the plurality of queries, and to initiate an action by a threat management facility based on the usage history.

FIG. 17 shows a method for augmenting data for use in threat investigation. In general, an endpoint in an enterprise network may be instrumented with sensors to detect security-related events occurring on the endpoint, e.g., as described herein. Event data from these sensors may be augmented with contextual information about a source of each event in order to facilitate improved correlation, analysis, and visualization at a threat management facility for the enterprise network.

As shown in step 1702, the method 1700 may include instrumenting an endpoint in an enterprise network with a sensor and a local security agent. The sensor may include any of the sensors described herein, and may be configured to generate an event record in response to an event. The local security agent may be configured to locally receive the event record from the sensor, or otherwise receive event data responsive to an event occurring on (or detected on) the endpoint.

As shown in step 1704, the method 1700 may include receiving event data, such as event records or the like from sensors on the endpoint.

As shown in step 1706, the method 1700 may include generating a source identifier that identifies a source of the event in a context of the sensor. This may include determining the context of the sensor (e.g., with the local security agent) by inspecting one or more network resources associated with the endpoint. In general this contextual identifier may augment source identification information using any information locally available to the local security agent and useful for determining a source of any corresponding event(s). The source identifier may combine any source identifiers available in the local context of the security agent such as one or more logical, physical, and/or virtual identifiers of a source of an event.

For example, the source identifier may include a physical address associated with the source, a network address associated with the source, and at least one temporal address assigned by the endpoint to the source of the event. As a more specific example, the physical address may include a medium access control address associated with the source, or any other physical layer address or the like associated with a physical address of the source and/or useful for identifying or accessing the source, e.g., in a physical layer of a network protocol stack. The network address may, for example, include an Internet Protocol address associated with the source, or any other network layer address or the like associated with a network address of the source and/or useful for identifying or accessing the source in a network layer of a network protocol stack. The temporal address may, for example, include the name of a process executing on the endpoint that is associated with the source, a directory location or path name, or any other transient identifier created by the endpoint to refer to an object or location on the endpoint, or a resource accessible to the network. The temporal address may also or instead include an identifier for at least one of a user of the endpoint, a device associated with the endpoint, a path associated with a computing object on the endpoint, a process executing on the endpoint, an application on the endpoint, or any other address created or assigned by the endpoint or the like. More generally, information on an endpoint may change. Directory structures may be altered. Files may be moved or renamed. Processes may be stopped and restarted with different process identifiers. By capturing such transient information around the time that an event occurs, temporal address information can provide an improved contextual perspective on the event, as well as the event's relationship to other events and other entities in an enterprise network.

Locally augmenting source identifiers can also permit context for an event to be explicitly associated with other source identification information, which can simplify the identification of associations or correlations among events that are being processed remotely from the endpoint. For example, there may be a half dozen sensors on an endpoint recording on a particular Internet Protocol address, without specifying whether each is a source of traffic from that IP address, a destination for network traffic from that source, a user of a resource at that IP address, and so forth. Similarly, an event may have multiple IP addresses associated with it, without specifying how each IP address relates to the event. For example, a firewall may receive three different IP addresses for a network request, such as an IP address for an endpoint, an IP address for a service requested from the endpoint, and an IP address for an authentication system used in connection with the request. Each of these IP addresses may properly be associated with a network request from the endpoint, but may have different relationships to another event from the endpoint, or from a different endpoint communicating through the firewall. By pre-computing this type of information at the endpoint and establishing the relationship of these various identifiers to an event, e.g., by explicitly identifying the relationship of the source with the IP address, and/or by specifying other address information associated with the source, a threat management facility can more quickly and efficiently analyze events in the proper context. Similarly, this type of extended source identification permits more accurate targeting of inquiries, analysis, and remediation.

For example, if an attack is detected from an IP address, the threat management facility can more quickly and directly inquire about what else in the enterprise network is associated with the IP address, what other devices or resources have a relationship with the IP address, and so forth. This permits identification of not only an IP address, but a particular user, a particular process and the like, as well as a more accurate picture of what other network resources (e.g., other connectivity pathways), users, and resources are associated with that IP address. Similarly, this permits specific associations at particular points in time. Thus, for example, an IP address may be explicitly associated with a particular MAC address, a particular user and/or a particular user at the time an event is recorded, even though these relationships are transient in nature.

The general approach described above advantageously supports joining of relevant information to an event record based on local contextual information at the point of origin, rather than requiring inferences about relationships to be made at a remote threat management facility where multiple event records from multiple sensors and endpoints are received. This permits an accurate, local join of the full state of an event, including information such as a known user, a known process, a known network adapter (or other hardware), and so forth. In particular, this permits a capture of transient, temporal information that may not otherwise be clearly associated with an event when analyzing data, and in particular, values that may change over time, such as an IP address, a user identifier, a MAC address, an application identifier, a process identifier, a file hash, and so forth. In one aspect, these temporal labels may be combined or associated with non-temporal information (e.g., a hardware device identifier for an endpoint) to facilitate useful and accurate correlations during downstream processing. Similarly, this supports improved graph creation and graph navigation by a human investigator, where events, entities, and relationships can be more accurately identified in order to support pivoting to different views or analysis as an investigation proceeds. It will also be appreciated that some or all of this contextual information may be stored on local data recorders unless/until requested or needed by a central threat management facility.

In addition to augmenting source identification information using local context available to the endpoint at the time an event is detected or recorded, an event may be further augmented with causally related events that are also available in the local context of the endpoint. For example, an event may be augmented with an event graph using, e.g., the techniques described herein. This mini-event graph may, for example, include a relatively small, local collection of causally related events. In one aspect, the mini-event graph may include one or more (causally) immediately preceding events, or one or more (causally) immediately following events. In another aspect, the mini-event graph may be a highly filtered event graph that includes one or two additional events such as a root cause identified for the event, a final action in a graph of events including the event, a known malicious action following, and causally related to, the event, and so forth. This may also or instead include condensed or summarized events, such as by condensing an auto-save or a copy to a USB drive as a single, summarized event in place of any number of related literal events associated with a particular user action or computer activity.

As shown in step 1708, the method 1700 may include creating a modified event record by appending the source identifier to the event record. This modified event record can include the event record from the sensor, along with any relevant event details, as well as an augmented source identifier as described above based on information available to a local security agent for the endpoint. This source identifier may usefully identify a source of the event in a context of the sensor and/or endpoint.

As shown in step 1710, the method 1700 may include storing the modified event record in a data recorder on the endpoint. This permits local logging with any desired duration or level of granularity independent of storage requirements or restrictions at a threat management facility that might receive the modified event record. Thus for example, if a remote threat management facility determines that a particular modified event record is not immediately relevant or useful, the local data recorder may nonetheless retain a copy in case a request for additional information is subsequently received from the threat management facility. The method 1700 may also or instead include storing a plurality of modified event records in the data recorder such as a stream of modified event records from multiple sensors on the endpoint, e.g., according to any logging policy, storage restrictions, or other considerations. In general, this permits the data recorder (e.g., under control of the local security agent) to respond to queries from resources external to the endpoint for additional data stored in the data recorder.

As shown in step 1712, the method 1700 may include transmitting the modified event record to a threat management facility.

As shown in step 1714, the method 1700 may include processing the modified event records, along with any other available information, at a remote threat management facility such as any of the threat management facilities described herein. In general, a relationship of one of the modified events record with one or more other modified event records stored at the threat management facility may be determined based on source identifiers that have been augmented with contextual data as described herein before transmitting to the threat management facility. A variety of useful tools for, e.g., forensic analysis, threat investigation, policy compliance, and so forth, may be performed at a threat management facility based on these modified event records.

For example, the method 1700 may include providing a user interface from the threat management facility for navigating a chain of events based on relationships among a plurality of source identifiers in a plurality of modified event records received at the threat management facility. This may include a display of associations among source identifiers that permits a user to navigate from source to source based on overlapping or otherwise related source identifiers in the augmented event record data. Similarly, the user interface may be configured to support navigating a chain of events based on relationships among a plurality of source identifiers in a plurality of modified event records, e.g., by displaying events in a graph, along with associations among the nodes that are identified or inferred based on the modified event records. The method 1700 may also or instead include creating a graph that causally associates two or more events based on a plurality of source identifiers in a plurality of modified event records received at the threat management facility, which may be displayed in the user interface, or otherwise used to process or analyze collections of events based on the modified event records.

In another aspect, this may include processing a stream of modified event records to evaluate security threats to an enterprise network, e.g., using any of the various techniques described herein, to detect threats and track causal chains of events back to a root cause. Similarly, processing may include processing a stream of modified event records at the threat management facility to evaluate a security state of the endpoint, e.g., by ensuring that particular events are associated with suitable users or processes, and so forth. In one aspect, sequences of events may be associated with one another, e.g., by determining a relationship of a source identifier for one event with one or more other source identifiers in modified event records received at the threat management facility. In another aspect, processing the stream of modified event records at the threat management facility may include deduplicating one or more event records based on a reconciliation of source identifiers. Other techniques for processing streams of modified event records may also or instead be employed.

In one aspect, there is disclosed herein a system including a local security agent executing on an endpoint and configured to receive data characterizing an event from a sensor on the endpoint; to generate an event record in response to the event; to determine a context of the sensor including a physical address associated with a source of the event and a temporal address assigned by the endpoint to the source of the event; to append a source identifier to the event record that identifies the source of the event including the context of the sensor, thereby providing a modified event record including the event record and the source identifier; and to transmit the modified event record to a remote resource. The local security agent may also or instead process events and augment event records to create modified event records as more generally described herein.

The system may also include a threat management facility such as any of the threat management facilities described herein. The threat management facility may, for example, be configured to receive a stream of modified event records from a plurality of endpoints in an enterprise network that includes the endpoint, and to evaluate security threats to the enterprise network based on the stream of modified event records, or to otherwise process a stream of modified event records as described herein.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, performs the steps of:
    receiving, at a stream service, an event stream including security events from one or more sensors of one or more endpoints in an enterprise network;
    storing the event stream in a data lake;
    storing a plurality of queries for execution against the event stream, the plurality of queries configured to investigate security issues within the enterprise network based on the event stream;
    monitoring a usage of the plurality of queries at one or more administrative consoles to a threat management facility for the enterprise network;
    identifying a usage history based on the usage of the plurality of queries, the usage history including a specific pattern of queries associated with a live threat and a context associated with the specific pattern of queries including one or more of the security events reported by the one or more sensors within the enterprise network and retrieved in response to the usage of the plurality of queries; and
    with the threat management facility and in response to the usage history, initiating a remedial action responsive to the live threat.

2. The computer program product of claim 1, wherein the remedial action includes a request from the threat management facility for additional information.

3. The computer program product of claim 1, wherein the specific pattern includes an increase in a popularity of a query or sequence of queries associated with a human level of interest and response indicative of a threat in the enterprise network.

4. A method comprising:
    storing an event stream including security events from one or more sensors on compute instances in an enterprise network;
    storing a plurality of queries for execution against the event stream, the plurality of queries configured to investigate security issues within the enterprise network based on the event stream;
    monitoring a usage of the plurality of queries;
    identifying a usage history based on the usage of the plurality of queries, the usage history including a specific pattern of queries associated with a live threat and context associated with the specific pattern of queries including events reported by the one or more sensors within the enterprise network; and
    initiating a responsive remedial action to the live threat from a threat management facility based on the usage history.

5. The method of claim 4, wherein the initiating the responsive remedial action includes transmitting a message to an administrator for the enterprise network.

6. The method of claim 4, wherein initiating the responsive remedial action includes crowd-sourcing a plurality of usage histories among a plurality of enterprises to identify successful responsive activity by other administrators.

7. The method of claim 4, wherein initiating the responsive remedial action includes initiating one or more of malware scanning and network isolation for one or more compute instances in the enterprise network.

8. The method of claim 4, wherein initiating the responsive remedial action includes generating a recommendation for one or more responsive remedial actions by an administrator of the enterprise network.

9. The method of claim 4, wherein initiating the responsive remedial action includes evaluating a usefulness of one of the plurality of queries based on a pattern of post-query activity.

10. The method of claim 4, wherein initiating the responsive remedial action includes recommending a next query to an administrator of the enterprise network.

11. The method of claim 4, wherein initiating the responsive remedial action includes initiating requests for additional information from local data recorders on compute instances within the enterprise network.

12. The method of claim 4, wherein initiating the responsive remedial action includes training a machine learning model to detect future threats based on the usage history.

13. The method of claim 4, wherein initiating the responsive remedial action includes identifying a pattern of queries in the specific pattern associated with a known threat and generating a recommendation for one or more responsive actions.

14. The method of claim 4, wherein initiating the responsive remedial action includes initiating a query for additional data.

15. The method of claim 4, wherein initiating the responsive remedial action includes initiating automated query activity with a query monitor for the enterprise network.

16. A system comprising:
one or more hardware processors;
a data lake storing an event stream including security events from one or more sensors on compute instances in an enterprise network;
an administrative console for executing queries against the event stream;
a database storing a plurality of queries for execution against the event stream at the administrative console, the plurality of queries configured to investigate security issues within the enterprise network based on the event stream; and
a query monitoring agent executing on the one or more hardware processors, the query monitoring agent configured by computer executable code to:
monitor a usage history of the plurality of queries and context including events reported by the one or more sensors within the enterprise network,
identify a specific pattern in the usage history associated with a live threat in the enterprise network, and
initiate a responsive remedial action by the live threat by a threat management facility based on the specific pattern and the context, wherein the responsive remedial action includes a message to an administrator for the enterprise network.

17. The system of claim 16, wherein usage history includes a change in a popularity of one or more of the plurality of queries.

18. The system of claim 16, wherein the usage history includes a pattern of changes to one or more of the plurality of queries.

19. The system of claim 16, wherein the usage history includes a pattern of post-query activities initiated from the administrative console.

20. The system of claim 16, wherein the usage history includes an increase in queries from the enterprise network correlated to an identification of a threat in the enterprise network.

* * * * *